(12) United States Patent
Koike et al.

(10) Patent No.: US 9,381,724 B2
(45) Date of Patent: *Jul. 5, 2016

(54) ENERGY CONVERSION FILM

(75) Inventors: Hiroshi Koike, Ibaraki (JP); Seiichiro Iida, Ibaraki (JP); Hidekazu Kodama, Tokyo (JP); Yoshinobu Yasuno, Tokyo (JP); Eiichi Fukada, Tokyo (JP)

(73) Assignee: YUPO CORPORATION, Tokyo (JP)

( * ) Notice: Subject to any disclaimer, the term of this patent is extended or adjusted under 35 U.S.C. 154(b) by 489 days.

This patent is subject to a terminal disclaimer.

(21) Appl. No.: 13/496,791

(22) PCT Filed: Sep. 17, 2010

(86) PCT No.: PCT/JP2010/066257
§ 371 (c)(1),
(2), (4) Date: Mar. 16, 2012

(87) PCT Pub. No.: WO2011/034186
PCT Pub. Date: Mar. 24, 2011

(65) Prior Publication Data
US 2012/0177907 A1 Jul. 12, 2012

(30) Foreign Application Priority Data

Sep. 17, 2009 (JP) ................. 2009-215184
Sep. 14, 2010 (JP) ................. 2010-205549
Sep. 14, 2010 (JP) ................. 2010-205554

(51) Int. Cl.
*B32B 27/08* (2006.01)
*B32B 27/16* (2006.01)
(Continued)

(52) U.S. Cl.
CPC ................ *B32B 27/08* (2013.01); *B32B 27/16* (2013.01); *B32B 27/20* (2013.01); *B32B 27/205* (2013.01);
(Continued)

(58) Field of Classification Search
CPC .. B32B 27/20; B32B 27/205; B32B 2264/02; B32B 2264/104; B32B 2264/12; B32B 2307/20; B32B 2307/202; B32B 2307/516; B32B 2307/518; B32B 2457/00
See application file for complete search history.

(56) References Cited

U.S. PATENT DOCUMENTS 4,377,616 A * 3/1983 Ashcraft ................. B32B 27/08
156/229
4,654,546 A 3/1987 Kirjavainen
(Continued)

FOREIGN PATENT DOCUMENTS

| CN | 1369366 | 9/2002 |
|----|---------|--------|
| CN | 1399661 | 2/2003 |

(Continued)

OTHER PUBLICATIONS

Chinese office action in CN 201080052144.1, dated Feb. 7, 2014 along with an English translation thereof.
(Continued)

*Primary Examiner* — Hai Vo
(74) *Attorney, Agent, or Firm* — Greenblum & Bernstein, P.L.C.

(57) ABSTRACT

An energy conversion film, which can hold a larger amount of charges by pores in the inside of the film and has high energy conversion performances, is provided, by obtaining a porous resin film with a high expansion ratio without adopting an expansion treatment with a high-pressure gas by forming a thermoplastic resin stretched film having a specified structure. The energy conversion film includes a core layer (A) having specified pores and composed of a thermoplastic resin stretched film including a thermoplastic resin and at least one of an inorganic powder and an organic filler.

3 Claims, 3 Drawing Sheets

(51) Int. Cl.
   *B32B 27/20* (2006.01)
   *B32B 27/32* (2006.01)
   *H01G 7/02* (2006.01)

(52) U.S. Cl.
   CPC ............... *B32B 27/32* (2013.01); *H01G 7/023* (2013.01); *B32B 2250/02* (2013.01); *B32B 2250/03* (2013.01); *B32B 2250/242* (2013.01); *B32B 2250/40* (2013.01); *B32B 2255/10* (2013.01); *B32B 2255/205* (2013.01); *B32B 2255/26* (2013.01); *B32B 2255/28* (2013.01); *B32B 2264/025* (2013.01); *B32B 2264/104* (2013.01); *B32B 2264/12* (2013.01); *B32B 2270/00* (2013.01); *B32B 2305/026* (2013.01); *B32B 2307/20* (2013.01); *B32B 2307/516* (2013.01); *B32B 2307/518* (2013.01); *B32B 2307/718* (2013.01); *B32B 2307/724* (2013.01); *B32B 2457/00* (2013.01); *Y10T 428/249953* (2015.04)

(56) References Cited

U.S. PATENT DOCUMENTS

| | | | |
|---|---|---|---|
| 2004/0161599 A1* | 8/2004 | Nishizawa et al. | 428/327 |
| 2006/0057347 A1* | 3/2006 | Squier et al. | 428/220 |
| 2010/0291363 A1 | 11/2010 | Koike et al. | |
| 2011/0143104 A1* | 6/2011 | Koike et al. | 428/195.1 |
| 2013/0309461 A1* | 11/2013 | Koike et al. | 428/195.1 |

FOREIGN PATENT DOCUMENTS

| | | |
|---|---|---|
| CN | 1478119 | 2/2004 |
| CN | 101228660 | 7/2008 |
| CN | 101682099 | 3/2010 |
| EP | 0 182 764 A2 | 5/1986 |
| JP | 49-7798 A | 1/1974 |
| JP | 5-41104 B2 | 6/1993 |
| JP | 3675827 B2 | 7/2005 |
| JP | 2008-282863 | 11/2008 |
| JP | 2009-37861 | 2/2009 |
| WO | 96/06718 A1 | 3/1996 |
| WO | 01/22858 A1 | 4/2001 |

OTHER PUBLICATIONS

E.P.O. Office Action in EP 10 817 299, mail date is Oct. 3, 2013.
Japan Office action in JP 2010-205554, issued Dec. 24, 2013 along with an english translation thereof.
International Search Report for PCT/JP2010/066257, mailed Nov. 2, 2010.
Hillenbrand et al., "Electret properties of biaxially stretched polypropylene films containing various additives", Journal of Physics D: Applied Physics, vol. 39, No. 3, Jan. 20, 2006, pp. 535-540.
Zhang et al., "Piezoelectric d33 coefficient of cellular polypropylene subjected to expansion by pressure treatment", Applied Physics Letters, vol. 85, No. 7, Aug. 16, 2004, pp. 1226-1228.
Behrendt et al., "Development of Porous Polypropylene Blends with NA11 Particles and Glass Hollow Spheres by Biaxial Stretching for Electret Applications", IEEE Transactions on Dielectrics and Electrical Insulation, vol. 13, No. 5, Oct. 2006, pp. 992-1000.
Behrendt et al., "Charge Storage Behavior of Isotropic and Biaxially-Oriented Polypropylene Films Containing α- and β-Nucleating Agents", Journal of Applied Polymer Science, vol. 99, No. 3, Feb. 5, 2006, pp. 650-658.
Japan Office action in JP 2010-205554, dated Feb. 25, 2014 along with an english translation thereof.
Notification of Reasons for Refusal for Japanese Patent Application No. 2010-205549 issued on Nov. 11, 2014; along with an English Translation thereof.
Japan Office action in JP 2010-205549, dated Aug. 5, 2014 along with an english translation thereof.

\* cited by examiner

ENERGY CONVERSION FILM

TECHNICAL FIELD

The present invention relates to an energy conversion film capable of being utilized for electro-mechanical energy conversion for converting mechanical energy such as an oscillation, a pressure change, and the like into electric energy, electro-thermal energy conversion for converting thermal energy such as infrared rays, a temperature change, and the like into electric energy, mechanical-thermal energy convention for converting mechanical energy into thermal energy, and the like.

In particular, an electretized film (ii) obtained by accumulating charges in the inside of the film of the present invention has excellent electro-mechanical energy conversion performances.

BACKGROUND ART

An electret is a raw material which semi-permanently holds electric polarization in the inside thereof even in a state where an electric field does not exist in the outside thereof, thereby forming an electric field (exerting an electric force) in the outside, and has referred to one obtained by thermally or electrically treating a polymer material or an inorganic material which conventionally hardly conducts electricity, thereby semi-permanently polarizing a part of the material (being electrostatically charged or holding charges).

Electrets composed of a polymer material have hitherto been used in various forms including a film, a sheet, a fiber, a non-woven fabric, and the like depending upon a use embodiment thereof. In particular, electret filters obtained by molding processing of an electret have been widely used for an application of an air filter capable of efficiently adsorbing a fine dust, an allergen, etc. by the electric field, or other applications. Also, in the electrets, the utilization for various applications as a material for electro-mechanical energy conversion, such as a speaker, a headphone, a microphone, an ultrasonic sensor, a pressure sensor, an acceleration sensor, an oscillation controlling apparatus, etc., has become widened.

An electret using a porous resin film is known to exhibit a piezoelectric effect and can be used for sound detection, sound generation, oscillation measurement, oscillation control, etc. As for such an electret using a porous resin film, there are proposed applications to an oscillator of audio equipment, such as a speaker, a headphone, a microphone, etc., a pressure sensor in a flexible sheet form, and the like while utilizing its light weight (Patent Document 1).

Also, it is said that when a porous resin film is expanded in the thickness direction by using a high-pressure gas, an electret using this is enhanced regarding performances as a piezoelectric element (Non-Patent Document 1).

In the light of the above, as a method for expanding a porous resin film in the thickness direction, there is proposed a method in which a film having pores in the inside thereof is previously prepared by biaxial stretching, into which is then penetrated a high-pressure gas, and subsequently, the film is thermally treated under reduced pressure to obtain a porous resin film with a high expansion ratio (Patent Document 2).

It was considered that by allowing such a porous resin film with a high expansion ratio to hold a larger amount of charges in pores in the inside thereof, it becomes possible to obtain an electret having excellent performances and stability.

However, although in the techniques seen in the above-described academic document and Patent Document 2, the high-pressure gas introduced into the pores of the porous resin film enlarges the pores under reduced pressure to increase the expansion ratio; when the film is allowed to stand as is, it easily returns into the original state. Therefore, it is necessary to thermally treat the film in its expanded state, thereby accelerating crystallization of the thermoplastic resin to fix the shape.

Nevertheless, in such an expanded film, since the gas comes out gradually under reduced pressure, it was difficult to keep the film at a fixed porosity. Also, when the thermal treatment temperature is excessively elevated, the gas permeability of the thermoplastic resin increases, and moreover, the internal gas easily comes out, whereby the expansion ratio is lowered. Thus, the thermal treatment cannot be sufficiently carried out. As a result, there was a problem that it is difficult to obtain a desired porosity.

Furthermore, such an expanded film involved such drawbacks that it easily collapses in the thickness direction; that its energy conversion efficiency is lowered depending upon the environment at the time of use; and that it is unsuitable as an electro-mechanical energy conversion material for converting mechanical energy into electric energy.

PRIOR ART DOCUMENTS

Patent Documents
    Patent Document 1: JP-B-05-041104
    Patent Document 2: Japanese Patent No. 3675827
Non-Patent Document
    Non-Patent Document 1: Applied Physics Letters, Volume 85, Issue 7

SUMMARY OF THE INVENTION

Problems that the Invention is to Solve

For that reason, the present invention was aimed to provide an energy conversion film having high energy conversion performances, in which a porous resin film with a high expansion ratio is obtained even without adopting an expansion treatment with a high-pressure gas as in the conventional technologies, so that a larger amount of charges can be held by pores in the inside of the film.

Means for Solving the Problems

In order to solve these problems, the present inventors made extensive and intensive investigations. As a result, it has been found that by forming a thermoplastic resin stretched film having a specified structure, expected performances can be obtained even without adopting an expansion treatment with a high-pressure gas, leading to accomplishment of the present invention.

That is, the present invention has the following constitutions.
(1) An energy conversion film (i) comprising a core layer (A) composed of a thermoplastic resin stretched film including a thermoplastic resin and at least one of an inorganic powder and an organic filler, wherein the core layer (A) contains pores having a height in the thickness direction of the film of from 3 to 30 μM and a diameter in the plane direction of the film of from 50 to 500 μm at a frequency of from 100 to 3,000 pores/mm$^2$ through the cross-sectional observation in the thickness direction.
(2) The energy conversion film (i) according to (1) above, wherein the thermoplastic resin stretched film includes from 50 to 88% by weight of the thermoplastic resin and from 12 to 50% by weight of the inorganic powder.

(3) The energy conversion film (i) according to (1) above, wherein the thermoplastic resin stretched film includes from 70 to 98% by weight of the thermoplastic resin and from 2 to 30% by weight of the organic filler.

(4) The energy conversion film (i) according to (2) above, wherein the thermoplastic resin stretched film includes from 50 to 88% by weight of the thermoplastic resin, from 12 to 50% by weight of the inorganic powder, and from 0 to 25% by weight of the organic filler.

(5) The energy conversion film (i) according to (3) above, wherein the thermoplastic resin stretched film includes from 70 to 98% by weight of the thermoplastic resin, less than 12% by weight of the inorganic powder, and from 2 to 30% by weight of the organic filler.

(6) The energy conversion film (i) according to any one of (1) to (5) above, wherein the thermoplastic resin includes a polyolefin based resin.

(7) The energy conversion film (i) according to any one of (1) to (6) above, wherein a median size (D50) of the inorganic powder or the organic filler, as measured by a particle size distribution meter by laser diffraction, is from 3 to 30 μm.

(8) The energy conversion film (i) according to any one of (4) to (6) above, wherein a median size (D50) of the mixture of the inorganic powder and the organic filler, as measured by a particle size distribution meter by laser diffraction, is from 3 to 30 μm.

(9) The energy conversion film (i) according to any one of (1) to (8) above, wherein the core layer (A) is a biaxially stretched thermoplastic resin stretched film.

(10) The energy conversion film (i) according to any one of (1) to (9) above, wherein an area stretch ratio of the core layer (A) is from 1.5 to 60 times.

(11) The energy conversion film (i) according to any one of (1) to (10) above which includes a surface layer (B) composed of a stretched resin film on at least one surface of the core layer (A).

(12) The energy conversion film (i) according to any one of (1) to (11) above, wherein a porosity is from 20 to 95%.

(13) The energy conversion film (i) according to any one of (1) to (12) above, wherein a water vapor permeability coefficient is from 0.1 to 2.5 g·mm/m²·24 hr.

(14) The energy conversion film (i) according to any one of (1) to (13) above, wherein a surface resistivity value of at least one surface thereof is from $1\times10^{13}$ to $9\times10^{17}\Omega$.

(15) The energy conversion film (i) according to any one of (1) to (14) above, wherein a thickness of the core layer (A) is from 10 to 500 μm.

(16) The energy conversion film (i) according to any one of (11) to (15) above, wherein a thickness of the surface layer (B) is from 0.1 to 200 μm.

(17) The energy conversion film (i) according to any one of (1) to (16) above which includes an anchor coat layer (C) on at least one surface thereof.

(18) The energy conversion film (i) according to (17) above, wherein a basis weight of the anchor coat layer (C) is from 0.001 to 5 g/m².

(19) An electretized film (ii) comprising the energy conversion film (i) according to (1) to (18) above, as electretized upon being subjected to a direct-current high-voltage discharge treatment.

(20) The electretized film (ii) according to (19) above, wherein a piezoelectric constant d33 is from 50 to 1,000 pC/N.

(21) An energy conversion apparatus material (iii) comprising the electretized film (ii) according to (19) or (20) above; and an electrically conductive layer (D) having a surface resistivity value of from $1\times10^{-2}$ to $9\times10^{7}\Omega$ on at least one surface of the electretized film (ii).

(22) A method for manufacturing an energy conversion apparatus material (iii) comprising providing an electrically conductive layer (D) having a surface resistivity value of from $1\times10^{-2}$ to $9\times10^{7}\Omega$ on at least one surface of the energy conversion film (i) according to any one of (1) to (18) above; and subsequently subjecting to a direct-current high-voltage discharge treatment to electretize the energy conversion film (i).

(23) A method for manufacturing an energy conversion apparatus material (iii) comprising providing an electrically conductive layer (D) having a surface resistivity value of from $1\times10^{-2}$ to $9\times10^{7}\Omega$ on at least one surface of the electretized film (ii) according to (19) or (20) above.

Effects of the Invention

The energy conversion film (i) of the present invention is not required to be subjected to an expansion treatment with a high-pressure gas or the like, and therefore, a subsequent thermal treatment is not particularly necessary. Since the energy conversion film (i) of the present invention is not a film whose expansion ratio is increased by an expansion treatment, it has such characteristic features that it does not thereafter shrink and that it hardly collapses in the thickness direction.

In particular, as compared with the shape (substantially spherical shape) of pores in a porous resin film with a high expansion ratio formed by the conventional expansion treatment, the energy conversion film (i) of the present invention has a lot of pores with shapes suited for the accumulation of charges (having a disk shape whose major axis is parallel to the film plane direction), and therefore, it is especially useful as a material for electro-mechanical energy conversion.

MODES FOR CARRYING OUT THE INVENTION

Figure 1:
FIG. 1 is a partially enlarged cross-sectional view of an embodiment of the energy conversion film (i) of the present invention.

The energy conversion film (i) of the present invention is hereunder described in detail. Incidentally, in this description, a numerical range expressed with "from a number to another number" means a range including the former number and the latter number as the lower limit and the upper limit.

The energy conversion film (i) of the present invention comprises a core layer (A) composed of a thermoplastic resin stretched film including a thermoplastic resin and at least one of an inorganic powder and an organic filler, wherein the core layer (A) contains pores having a height in the thickness direction of the film of from 3 to 30 μm and a diameter in the plane direction of the film of from 50 to 500 μm at a frequency of from 100 to 3,000 pores/mm² through the cross-sectional observation in the thickness direction.

[Core Layer (A)]

The core layer (A) which is used in the present invention is a layer composed of a resin film, in the inside of which are formed pores by stretching a thermoplastic resin film containing at least one of an inorganic powder and an organic filler. The pores formed in the core layer (A) has both a shape suited for the accumulation of charges and a shape capable of bringing high compression recovery properties for the core layer (A).

Also, the core layer (A) is characterized by containing pores having a height in the thickness direction of the film of from 3 to 30 μm, preferably from 4 to 20 μm, and more preferably from 5 to 15 μm and a diameter in the plane direction of the film of from 50 to 500 μm, preferably from 80 to 400 μm, and more preferably from 100 to 300 μm at a frequency of from 100 to 3,000 pores/mm$^2$ through the cross-sectional observation in the thickness direction.

In the case where the shape (size) of the pores is observed in an arbitrary cross section, as a matter of course, it is variable depending upon the position at which the pores are seen. However, the present invention is characterized in that a lot of rough and large pores falling within the foregoing range are formed, and it is characterized by containing pores of the same size at a frequency of from 100 to 3,000 pores/mm$^2$, preferably from 150 to 2,500 pores/mm$^2$, more preferably from 200 to 2,000 pores/mm$^2$, and still more preferably from 300 to 1,500 pores/mm$^2$ without depending upon the position at which the pores are seen.

In the energy conversion film (i) of the present invention, it is considered that a pair of different charges is held on the opposing inner planes of the individual pore in the inside of the core layer (A). For that reason, since the pore accumulates charges in the inside thereof, it is considered that similar to the case of a single plate type capacitor, the pore is required to have a certain or more amount of each of an area and a height. Unless the pore has a certain or more amount of an area, a sufficient electrostatic capacity is not obtained, so that an electret having excellent performances cannot be obtained. Also, unless the pore has a certain or more amount of a height (distance), discharge (short circuit) is generated in the inside of the pore, so that the charges cannot be accumulated. However, conversely, when the height (distance) is too large, it is disadvantageous for the polarization of charges, so that an electret having excellent stability cannot be obtained.

For that reason, it was considered that the larger the size (area) of the individual pore in the inside of the core layer (A), the more effective the function is. But, if the size of the pore is excessively increased, the adjoining pores interconnect with each other, and discharge (short circuit) is generated between the adjoining pores, so that the charges are inversely hardly accumulated.

In consequence, when the size (diameter) of the pore is less than the range of the present invention, it is not preferable because there may be the case where the energy conversion efficiency is not sufficiently obtained. On the other hand, when the size (diameter) of the pore exceeds the range of the present invention, it is not preferable because there may be the case where the energy conversion efficiency is not stable.

Also, it was considered that when the number of effective pores increases, the accumulation ability of charges is enhanced, and the energy conversion efficiency is enhanced. But, when the number of pores in a certain size or more is excessively large, it is not preferable either, from the standpoints that a possibility that the adjoining pores interconnect with each other increases, that the strength of the film per se is lowered, and that a structure in which recovery against an external force such as compression, etc. is hardly achieved is presented. In the meantime of repeating compression and recovery, such a shortage of the compression recovery force brings a harmful influence such as a reduction of the recovery rate, etc., and there may be the case where inconvenience is generated as an electro-mechanical energy conversion material for converting mechanical energy into electric energy.

In consequence, when the number of pores is less than the range of the present invention is not preferable because there may be the case where the energy conversion efficiency, it is not sufficiently obtained. On the other hand, when the number of pores exceeds the range of the present invention is not preferable because there may be the case where the energy conversion efficiency, it is not stable.

The formation of such a pore in the present invention is achieved by allowing a thermoplastic resin that is a polymer material having excellent insulating properties to contain at least one of an inorganic powder and an organic filler and subjecting this to stretch molding as described later.

In particular, by performing stretch molding at a temperature lower than a glass transition point or a melting point of the thermoplastic resin, the pores are formed while allowing at least one of an inorganic powder and an organic filler to work as a starting point (nucleus).

A thickness of the core layer (A) is preferably in the range of from 10 to 500 μm, more preferably in the range of from 20 to 300 μm, and especially preferably in the range of from 30 to 150 μm.

When the subject thickness is less than 10 μm, it is not preferable because it is difficult to uniformly form pores having a size so as to effectively function for the energy conversion in a desired number. On the other hand, when the subject thickness exceeds 500 μm, it is not preferable because in performing the charge injection (direct-current high-voltage discharge treatment) as described later to achieve the electretization, it is difficult to allow the charges to reach the layer inside, so that the expected performances of the present invention may not be exhibited.

[Thermoplastic Resin]

The thermoplastic resin which is used for the core layer (A) is preferably a polymer material having insulating properties that hardly conducts electricity. For example, there can be used polyolefin based resins such as ethylene based resins inclusive of high-density polyethylene, middle-density polyethylene, and low-density polyethylene, propylene based resins, polymethyl-1-pentene, cyclic polyolefins, etc.; functional group-containing polyolefin based resins such as an ethylene/vinyl acetate copolymer, an ethylene/acrylic acid copolymer, maleic acid-modified polyethylene, maleic acid-modified polypropylene, etc.; polyamide based resins such as nylon-6, nylon-6,6, etc.; polyester based resins such as polyethylene terephthalate and copolymers thereof, polybutylene terephthalate, polybutylene succinate, polylactic acid, aliphatic polyesters, etc.; polycarbonates, atactic polystyrene, syndiotactic polystyrene, and the like. Of these thermoplastic resins, polyolefin based resins and functional group-containing polyolefin based resins, each having low hygroscopicity and high insulating properties, are preferably used.

Examples of the polyolefin based resin include homopolymers of olefins such as ethylene, propylene, butene, butylene, butadiene, isoprene, chloroprene, methylpentene, a cyclobutene, a cyclopentene, a cyclohexene, a norbornene, a tricyclo-3-decene, etc.; and copolymers composed of two or more kinds of these olefins. Specific examples of the polyolefin based resins include high-density polyethylene, middle-density polyethylene, propylene based resins, copolymers of ethylene and other olefin, and copolymers of propylene and other olefin.

Of these polyolefin based resins, propylene homopolymer which is isotactic or syndiotactic and exhibit stereoregularity to various degrees; or propylene based resin inclusive of propylene based copolymer composed mainly of propylene and obtained by copolymerizing this and an α-olefin such as ethylene, 1-butene, 1-hexene, 1-heptene, 4-methyl-1-pentene, etc. is preferable from the viewpoints of, in addition to non-hygroscopicity and insulating properties, processability, Young's modulus, durability, costs, and the like.

The foregoing propylene based copolymer may be a two component system or a three or more component system, and it may be a random copolymer or a block copolymer.

Specific examples of the functional group-containing polyolefin based resin include copolymers of the foregoing olefin and a copolymerizable functional group-containing monomer.

As such a functional group-containing monomer, styrenes such as styrene, α-methylstyrene, etc., carboxylic acid vinyl esters such as vinyl acetate, vinyl alcohol, vinyl propionate, vinyl butyrate, vinyl pivalate, vinyl caproate, vinyl laurate, vinyl stearate, vinyl benzoate, vinyl butylbenzoate, vinyl cyclohexanecarboxylate, etc., (meth)acrylic acid, acrylic acid esters such as methyl (meth)acrylate, ethyl (meth)acrylate, butyl (meth)acrylate, hexyl (meth)acrylate, octyl (meth)acrylate, 2-ethylhexyl (meth)acrylate, stearyl (meth)acrylate, benzyl (meth)acrylate, cyclohexyl (meth)acrylate, isobornyl (meth)acrylate, dicyclopentanyl (meth)acrylate, (meth)acrylamide, N-methylol (meth)acrylamide, etc., and vinyl ethers such as methyl vinyl ether, ethyl vinyl ether, propyl vinyl ether, butyl vinyl ether, cyclopentyl vinyl ether, cyclohexyl vinyl ether, benzyl vinyl ether, phenyl vinyl ether, etc. are especially representative. Resins obtained by properly selecting and polymerizing one or two or more kinds of monomers among these functional group-containing monomers, as the need arises, can be used.

Furthermore, it is also possible to use a resin obtained by graft modifying such a polyolefin based resin and functional group-containing polyolefin based resin, if desired.

For the graft modification, known techniques can be adopted, and specific examples thereof include graft modification with an unsaturated carboxylic acid or a derivative thereof. As the unsaturated carboxylic acid, there can be exemplified (meth)acrylic acid, maleic acid, fumaric acid, itaconic acid, and the like. Also, as the derivative of the unsaturated carboxylic acid above, it is possible to use an acid anhydride, an ester, an amide, an imide, a metal salt, or the like. Specifically, there can be exemplified maleic anhydride, itaconic anhydride, citraconic anhydride, methyl (meth)acrylate, ethyl (meth)acrylate. butyl (meth)acrylate, glycidyl (meth)acrylate, monoethyl maleate, diethyl maleate, monomethyl fumarate, dimethyl fumarate, monomethyl itaconate, diethyl itaconate, (meth)acrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium (meth)acrylate, potassium (meth)acrylate, and the like.

The graft modified material which can be used is one obtained through graft modification by adding a graft monomer in an amount of generally from 0.005 to 10% by weight, and preferably from 0.01 to 5% by weight relative to the polyolefin based resin or functional group-containing polyolefin based resin.

As the thermoplastic resin which is used for the core layer (A), one kind may be selected and used alone, or two or more kinds may be selected and used in combination among the foregoing thermoplastic resins.

In the case where a propylene based resin is used as the thermoplastic resin, in order to make the stretch moldability as described later more satisfactory, it is preferable to blend and use a resin having a melting point or glass transition point lower by from 10 to 70° C. than that of the propylene homopolymer in an amount of from 2 to 25% by weight. As such a low-melting point resin, there can be exemplified from high-density to low-density polyethylenes and cyclic polyolefins.

[Inorganic Powder]

The inorganic powder which is used for the core layer (A) is one to be added for the purpose of forming pores in the core layer (A) while allowing this to work as a nucleus. The inorganic powder is preferable from the standpoints of costs and easiness of controlling the particle size. It is possible to allow the core layer (A) to form pores in the inside thereof by the addition of such an inorganic powder and the stretching step as described later. By controlling the content of the inorganic powder, it is possible to control the frequency of pores, and by controlling the particle size of the inorganic powder, it is possible to control the size of the pore.

In order to adjust the frequency of pores which are formed in the inside of the core layer (A) in the present invention, it is preferable that the core layer (A) contains from 50 to 88% by weight of the thermoplastic resin and from 50 to 12% by weight of the inorganic powder. It is more preferable that the core layer (A) contains from 60 to 87% by weight of the thermoplastic resin and from 40 to 13% by weight of the inorganic powder; it is still more preferable that the core layer (A) contains from 65 to 86% by weight of the thermoplastic resin and from 35 to 14% by weight of the inorganic powder; and it is especially preferable that the core layer (A) contains from 70 to 85% by weight of the thermoplastic resin and from 30 to 15% by weight of the inorganic powder.

When the content of the inorganic powder is less than 12% by weight, the number of pores which are formed in the stretching step as described later is few, so that there may be the case where the energy conversion efficiency is not sufficiently obtained, and the expected object is hardly achieved. On the other hand, when it exceeds 50% by weight, it is not preferable because the strength of the film is relatively lowered, and the compression recovery force is lowered, so that the energy conversion efficiency tends to be not stable.

As specific examples of the inorganic powder, there can be used calcium carbonate, calcined clay, silica, diatomaceous earth, white clay, talc, titanium oxide, barium sulfate, alumina, zeolite, mica, sericite, bentonite, sepiolite, vermiculite, dolomite, wollastonite, glass fibers, and the like.

[Organic Filler]

The organic filler which is used for the core layer (A) is one to be added for the purpose of forming pores in the core layer (A) while allowing this to work as a nucleus. The organic filler is preferable from the standpoints of stability of the shape which is close to a true sphere and uniformity of the particle size. It is possible to allow the core layer (A) to form pores in the inside thereof by the addition of such an organic filler and the stretching step as described later. By controlling the content of the organic filler, it is possible to control the frequency of pores, and by controlling the particle size of the organic filler, it is possible to control the size of the pore.

In order to adjust the frequency of pores which are formed in the inside of the core layer (A) in the present invention, it is preferable that the core layer (A) contains from 70 to 98% by weight of the thermoplastic resin and from 30 to 2% by weight of the organic filler. It is more preferable that the core layer (A) contains from 75 to 97% by weight of the thermoplastic resin and from 25 to 3% by weight of the organic filler; it is still more preferable that the core layer (A) contains from 78 to 96% by weight of the thermoplastic resin and from 22 to 4% by weight of the organic filler; and it is especially preferable that the core layer (A) contains from 80 to 95% by weight of the thermoplastic resin and from 20 to 5% by weight of the organic filler.

When the content of the organic filler is less than 2% by weight, the number of pores which are formed in the stretching step as described later is few, so that there may be the case where the energy conversion efficiency is not sufficiently obtained, and the expected object is hardly achieved. On the other hand, when it exceeds 30% by weight, it is not preferable because the strength of the film is relatively lowered, and the compression recovery force is lowered, so that the energy conversion efficiency tends to be not stable.

In the case of adding the organic filler, it is preferable to select a resin of a different kind from the thermoplastic resin as the main component. For example, in the case where the thermoplastic resin is a polyolefin based resin, it is preferable to use, as the organic filler, a resin which is incompatible with polyolefin and which does not have fluidity in kneading with the polyolefin based resin and stretch molding because of crosslinking, such as crosslinked acrylic resins, crosslinked methacrylic resins, crosslinked styrene resins, crosslinked urethane resins, etc. Also, resin particles composed of such a crosslinked resin are more preferable from the standpoints that they are available as a granular particle whose particle size (median size) has been adjusted in advance; that they can be handled in the same manner as that in the inorganic powder; and that the size of the pore can be easily adjusted.

Also, in the case where the thermoplastic resin is a polyolefin based resin, for example, it is possible to use, as the organic filler, a polymer having a melting point (for example, from 170 to 300° C.) or a glass transition temperature (for example, from 170 to 280° C.), which is higher than the melting point of the polyolefin based resin, such as polyethylene terephthalate, polybutylene terephthalate, polycarbonates, nylon-6, nylon-6,6, cyclic olefins, polystyrene, polymethacrylates, etc., upon being finely dispersed in the polyolefin based resin that is a matrix resin by means of melt kneading.

Also, for the purpose of forming pores in the core layer (A), it is possible to use the inorganic powder and the organic filler in combination.

In the case of jointly using the organic filler in addition to the inorganic powder, the core layer (A) preferably contains from 0 to 25% by weight of the organic filler, more preferably contains from 0 to 15% by weight of the organic filler, and still more preferably contains from 0 to 10% by weight of the organic filler, in addition to from 50 to 88% by weight of the thermoplastic resin above and from 12 to 50% by weight of the inorganic powder. When the content of the organic filler exceeds 25% by weight under the same condition, it is not preferable because the strength of the film is relatively lowered, and the compression recovery force is lowered, so that the energy conversion efficiency tends to be not stable.

In the case of jointly using the inorganic powder in addition to the organic filler, the core layer (A) preferably contains less than 12% by weight of the inorganic powder, more preferably contains from 0 to 11.9% by weight of the inorganic powder, still more preferably contains from 0 to 10% by weight of the inorganic powder, and especially preferably from 0 to 5% by weight of the inorganic powder, in addition to from 70 to 98% by weight of the thermoplastic resin above and from 2 to 30% by weight of the organic filler. When the content of the inorganic powder is 12% by weight or more under the same condition, it is not preferable because the strength of the film is relatively lowered, and the compression recovery force is lowered, so that the energy conversion efficiency tends to be not stable.

Also, as for the inorganic powder or organic filler in the present invention, taking the size of pores to be formed into consideration, it is preferable to use a material having a median size (D50), as measured by a particle size distribution meter by laser diffraction as described later in detail, of from 3 to 30 µm. As for the inorganic powder or organic filler in the present invention, it is more preferable to use a material having a median size (D50) of from 4 to 20 µm, and it is still more preferable to use a material having a median size (D50) of from 4 to 15 µm.

When the median size (D50) is less than 3 µm, the size of the pores to be formed is small, it is difficult to form pores having a size as specified in the present invention in a specified amount, and the charges are hardly accumulated, so that the effects of the present invention are hardly exhibited. On the other hand, when the median size (D50) exceeds 30 µm, the size of the pores to be formed is excessively large, the adjoining pores interconnect with each other, and discharge (short circuit) is generated between the adjoining pores, so that the charges are inversely hardly accumulated. Also, a microscopic difference in a density in the film becomes large, so that the uniformity of the film tends to be impaired. For that reason, in performing the electretization by the charge injection, local discharge is generated, and defects such as perforation, etc. are easily caused.

In the case of using the inorganic powder and the organic filler in combination, in view of the same gist, it is preferable that the median size (D50) as measured by a particle size distribution meter by laser diffraction is from 3 to 30 µm. As for the median size (D50) in the case of using the inorganic powder and the organic filler in combination, materials having individually the range may be used in combination, or those having a median size (D50) of the range, which is measured by a particle size distribution meter by laser diffraction in the state that the two are mixed, may be used. The median size (D50) as measured by a particle size distribution meter by laser diffraction in the state that the two are mixed is preferably from 3 to 30 µm, more preferably from 4 to 20 µm, and still more preferably from 4 to 15 µm.

[Other Components]

To the thermoplastic resin which is used for the core layer (A), a heat stabilizer (antioxidant), a light stabilizer, a dispersant, a lubricant, and the like can be arbitrarily added, as the need arises. In the case of adding a heat stabilizer, it is usually used in an amount ranging from 0.001 to 1% by weight relative to the resin. As specific examples of the heat stabilizer, steric hindered phenol based, phosphorus based, or amine based stabilizers, and the like can be used.

In the case of adding a light stabilizer, it is usually used in an amount ranging from 0.001 to 1% by weight relative to the resin. As specific examples of the light stabilizer, steric hindered amine based, benzotriazole based, or benzophenone based light stabilizers, and the like can be used.

The dispersant or the lubricant is used for the purpose of, for example, dispersing the inorganic powder or organic filler in the resin. A use amount thereof is usually in the range of from 0.01 to 4% by weight relative to the resin. As specific examples thereof, silane coupling agents, higher fatty acids such as oleic acid, stearic acid, etc., metallic soaps, a polyethylene acrylic acid copolymer, a polyethylene methacrylic acid copolymer, and salts thereof, and the like can be used.

[Surface Layer (B)]

It is desirable that the energy conversion film (i) of the present invention is provided with a surface layer (B) composed of a stretched resin film on at least one surface thereof. The surface layer (B) has a role as a protective layer for mainly preventing the leakage of charges accumulated in the core layer (A).

In view of the fact that the surface layer (B) is provided, it is possible to prevent the atmospheric discharge of the pores formed in the core layer (A) upon communication with the outside, and in performing the electretization by the charge injection, the dielectric strength of the energy conversion film (i) is enhanced, thereby enabling to inject a larger amount of charges at a high voltage.

It is desirable that the surface layer (B) has a composition which form pores more hardly as compared with the core layer (A) and has a structure with a low porosity. The formation of such a surface layer (B) can be achieved by a technique for making the content of the inorganic powder or organic filler in the surface layer (B) smaller than that in the core layer (A); a technique for making the particle size of the inorganic powder or organic filler used in the surface layer (B) smaller than that of the inorganic powder or organic filler used in the core layer (A); or a technique for making a difference in a stretch ratio between the core layer (A) and the surface layer (B) by, for example, forming the core layer (A) through biaxial stretching and forming the surface layer (B) through uniaxial stretching.

As the thermoplastic resin constituting the surface layer (B), the same thermoplastic resins exemplified in the section of the core layer (A) can be used. From the viewpoint of stretching properties, it is preferable to use a resin of the same kind as that in the core layer (A) as the thermoplastic resin which is used for the surface layer (B). Specifically, it is preferable to use a polyolefin based resin.

Though the surface layer (B) may or may not contain an inorganic powder or an organic filler, from the viewpoint of modifying electric properties such as dielectric constant of the surface layer (B), etc., it is preferable that the surface layer (B) contains an inorganic powder or an organic filler. In the case where the surface layer (B) contains an inorganic powder or an organic filler, the same inorganic powders or organic fillers exemplified in the section of the core layer (A) can be used.

In the case of using an inorganic powder or an organic filler in the surface layer (B), a material of a kind the same as or different from that used in the core layer (A) may be used.

Since the inorganic powder or organic filler generally has a dielectric constant higher than that of the thermoplastic resin, it is suited for the modification of electric properties of the surface layer (B). In particular, in the case of using, as the thermoplastic resin of the surface layer (B), a resin having a low dielectric constant such as polyolefin based resins, etc., by allowing the surface layer (B) to contain an inorganic powder or an organic filler, when a high voltage is applied at the time of electretization treatment, it is possible to allow the charges to reach the core layer (A) due to a dielectric effect thereof. Inversely, after the electretization treatment, an effect for holding the charges of the core layer (A) without escaping due to low dielectric properties of the polyolefin based resin as the main component is obtained.

It is preferable that the surface layer (B) of the present invention is composed of a stretched resin film. In the surface layer (B), the uniformity of a thickness (film thickness) is enhanced due to the stretching step as described later in detail, thereby contriving to unify electric properties such as dielectric strength, etc. When the thickness of the surface layer (B) is non-uniform, at the time of charge injection using a high voltage, local discharge concentration occurs with ease especially in a thin portion, and the effective charge injection cannot be expected.

The surface layer (B) may be of not only a single-layered structure but a multi-layered structure composed of two or more layers. In the case of a multi-layered structure, it becomes possible to design the energy conversion film (i) provided with higher charge holding performances by changing the kinds and contents of the thermoplastic resin, the inorganic powder, and the organic filler to be used in each layer.

It is preferable that the surface layer (B) is provided on at least one surface of the core layer (A), and it is more preferable that the surface layer (B) is provided on the both surfaces of the core layer (A). In the case of providing the surface layer (B) on the both surfaces of the core layer (A), the composition and constitution of each of the back and front may be the same as or different from each other.

A thickness of the surface layer (B) of the present invention is preferably in the range of from 0.1 to 200 µm, more preferably in the range of from 0.3 to 100 µm, still more preferably in the range of from 0.5 to 50 µm, and especially preferably in the range of from 0.7 to 30 µm. When the subject thickness is less than 0.1 µm, it is difficult to uniformly provide the surface layer (B), and a portion where the surface layer (B) does not partially exist is generated, so that there may be the case where expected effects such as an enhancement of the dielectric strength, uniform charge induction, etc. cannot be exhibited. On the other hand, when it exceeds 200 µm, it is not preferable because in subjecting the energy conversion film (i) to charge injection (direct-current high-voltage discharge treatment) as described later to achieve the electretization, it is difficult to allow the charges to reach the core layer (A), and the expected performances of the present invention may not be exhibited. Also, a proportion of a layer which hardly causes elastic deformation in the thickness direction increases, and a compression deformation rate of the energy conversion film (i) is lowered, resulting in a decrease of the energy conversion efficiency, and hence, such is not preferable.

[Lamination]

For lamination of the core layer (A) and the surface layer (B), various known methods can be adopted. Specific examples thereof include a co-extrusion system with a multi-layered die using a feed block or a multi-manifold; an extrusion lamination system with plural dies; and the like. Furthermore, there is exemplified a combined method of a co-extrusion system with a multi-layered die and an extrusion lamination system.

In the core layer (A) and the surface layer (B), from the viewpoint of thickness uniformity, it is preferable that after laminating the core layer (A) and the surface layer (B), the laminate is stretched in at least a uniaxial direction. By stretching after the lamination with the core layer (A), the uniformity in the film thickness as the energy conversion film (i) is enhanced as compared with the lamination of the stretched films each other, and as a result, electric properties such as insulating pressure resistance, etc. are enhanced.

[Stretching]

In the present invention, the core layer (A) is a resin stretched film. A lot of pores are formed in the inside of the core layer (A) by stretching. From the viewpoint of holding charges, it is desirable that each of the pores to be formed in the energy conversion film (i) is large, a number of pores is large, and the pores are located independently of each other. The size of the pore can be made large in the case of stretching in a biaxial direction as compared with the case of stretching in only a uniaxial direction. In particular, in a film obtained by stretching in a biaxial direction of the width direction and flow direction thereof, since disk-shaped pores having been drawn out in the plane direction can be formed, the accumulation of charges having been positively and negatively polarized within the pore due to the electretization is easily achieved, and charge holding performances of an electretized film (ii) are excellent. In consequence, it is preferable to use a biaxially stretched resin stretched film for the core layer (A) in the energy conversion film (i) of the present invention.

Stretching of the core layer (A), the surface layer (B), and the energy conversion film (i) that is a laminate of these layers can be performed by various known methods.

As specific methods of stretching, there can be exemplified a vertical stretching method utilizing a difference in the peripheral speed of a group of rolls; a horizontal stretching method using a tenter oven; a rolling method; a simultaneous biaxial stretching method by a combination of a tenter oven and a linear motor; a simultaneous biaxial stretching method by a combination of a tenter oven and a pantograph; and the like. Also, there can be exemplified a simultaneous biaxial stretching method by a tubular method that is a stretching method of an inflation film.

A temperature at the time of stretching can be determined within the range from a glass transition point temperature or higher of the main thermoplastic resin to be used for each layer to a melting point of a crystal part thereof. In the case of stretching the energy conversion film (i) that is a laminate of the core layer (A) and the surface layer (B), it is appropriate to set the stretching temperature in conformity with the layer whose basis weight to be set is larger (usually the core layer (A)).

An index thereof is a temperature lower by from 1 to 70° C. than the melting point of the thermoplastic resin to be used. Specifically, in the case where the thermoplastic resin of each layer is a propylene homopolymer (melting point: 155 to 167° C.), the stretching temperature is from 100 to 166° C.; and in the case where the thermoplastic resin of each layer is high-density polyethylene (melting point: 121 to 136° C.), the stretching temperature is from 70 to 135° C.

As a matter of course, when resins having a different melting point or glass transition point from each other are used as the thermoplastic resins to be used for the core layer (A) and the surface layer (B), respectively to determine the stretching temperature, it is possible to adjust the degree of the pore formation of each of the layers.

A stretch ratio in the core layer (A) is not particularly limited and is properly determined while taking the properties of the thermoplastic resin to be used for the resin film (i), the porosity to be obtained as described later, and the like.

For example, in the case of using a propylene homopolymer or a copolymer thereof as the thermoplastic resin, the stretch ratio in the core layer (A) is from about 1.2 to 12 times, and preferably from 2 to 10 times in the case of stretching in a uniaxial direction; and from 1.5 to 60 times, and preferably from 4 to 50 times in terms of an area ratio (the product of a vertical ratio and a horizontal ratio) in the case of stretching in a biaxial direction. In the case of using other thermoplastic resin, the stretch ratio in the core layer (A) is from 1.2 to 10 times, and preferably from 2 to 5 times in the case of stretching in a uniaxial direction; and from 1.5 to 20 times, and preferably from 4 to 12 times in terms of an area ratio in the case of stretching in a biaxial direction.

In the case of stretching in a biaxial direction, it is preferable that the vertical ratio and the horizontal ratio are set to be equal to each other to the utmost, because it is easy to form disk-shaped pores which are easy to accumulate charges and to adjust the shape and frequency of pores through the cross-sectional observation in an arbitrary direction within the ranges specified in the present invention, respectively. For that reason, in the case of stretching in a biaxial direction, a ratio of the vertical ratio and the horizontal ratio is preferably from 0.4 to 2.5, more preferably from 0.5 to 2, still more preferably from 0.7 to 1.5, and especially preferably from 0.8 to 1.3.

Also, from the viewpoint of stable stretch molding, a stretch rate is preferably in the range of from 20 to 350 m/min.

[Anchor Coat Layer (C)]

For the purpose of expanding an application after the electretization by further sticking other raw material onto the surface of the energy conversion film (i), it is preferable to provide an anchor coat layer (C) on one surface or both surfaces thereof, thereby enhancing the adhesion to an adhesive, a vapor deposited metal film, or the like.

It is preferable to use a polymer binder for the anchor coat layer (C). Specific examples of such a polymer binder include polyethyleneimine based polymers such as polyethyleneimine, polyethyleneimines modified with an alkyl having a carbon number of from 1 to 12, poly(ethyleneimine-urea), etc.; polyaminepolyamide based polymers such as an ethyleneimine adduct of polyaminepolyamide, an epichlorohydrin adduct of polyaminepolyamide, etc.; acrylic ester based polymers such as an acrylic acid amide-acrylic ester copolymer, an acrylic acid amide-acrylic ester-methacrylic ester copolymer, derivatives of polyacrylamide, oxazoline group-containing acrylic ester based polymers, etc.; polyvinyl alcohol based polymers inclusive of polyvinyl alcohol and modified products thereof; water-soluble resins such as polyvinylpyrrolidone, polyethylene glycol, etc.; and polypropylene based polymers such as chlorinated polypropylene, maleic acid-modified polypropylene, acrylic acid-modified polypropylene, etc.; and besides, organic solvent-diluted resins or water-diluted resins of thermoplastic resins such as polyvinyl acetate, polyurethane, an ethylene-vinyl acetate copolymer, polyvinylidene chloride, an acrylonitrile-butadiene copolymer, polyesters, etc.; and the like. Of these, polyethyleneimine based polymers, polyaminepolyamide based polymers, polyvinyl alcohol based polymers, and polypropylene based polymers have an excellent anchor effect to the energy conversion film (i) and thus are preferable.

A basis weight of the anchor coat layer (C) is preferably from 0.001 to 5 g/m$^2$, more preferably from 0.005 to 3 g/m$^2$, and especially preferably from 0.01 to 1 g/m$^2$ as calculated by a solids content. When the basis weight of the anchor coat layer (C) is less than 0.001 g/m$^2$, the effect to be brought by providing the anchor coat layer (C) is not sufficiently obtained. On the other hand, when it exceeds 5 g/m$^2$, it is not preferable because it is difficult to uniformly keep the film thickness of the anchor coat layer (C) that is a coating layer; the uniformity of electric properties of the energy conversion film (i) are impaired by deviation of the film thickness; the anchor effect is lowered due to a shortage of cohesion of the anchor coat layer (C) per se; or a surface resistivity value of the anchor coat layer (C) is lowered and becomes less than $1 \times 10^{13} \Omega$, whereby the charges easily escape through the surface, and thus, in performing the electretization of the energy conversion film (i), the charges are hardly injected, and the charges cannot reach the core layer (A), so that the expected performances of the present invention are hardly revealed.

As a method of providing the anchor coat layer (C) on the energy conversion film (i), a method of coating a coating solution containing the foregoing polymer binder on the energy conversion film (i) is preferable. The anchor coat layer (C) can be formed by forming a coating film of the foregoing coating solution on the energy conversion film (i) by using a known coating apparatus and drying it.

Specific examples of the coating apparatus include a die coater, a bar coater, a comma coater, a lip coater, a roll coater, a curtain coater, a gravure coater, a spray coater, a squeeze coater, a blade coater, a reverse coater, an air knife coater, a size press coater, and the like.

As for a timing of providing the anchor coat layer (C) on the energy conversion film (i), it may be either before or after the electretization treatment as described later in detail.

[Porosity]

The energy conversion film (i) of the present invention has a lot of fine pores in the inside of the film, and a porosity as calculated according to the following expression (1) is preferably from 20 to 95%, more preferably from 30 to 80%, and still more preferably from 35 to 65%. When the porosity of the energy conversion film (i) is less than 20%, the accumulation capacity of charges is low, so that there may be the case where even when formed into the electretized film (ii) or energy conversion apparatus material (iii) upon injection with charges, the performances are deteriorated. On the other hand, when it exceeds 95%, the pores tend to easily interconnect with each other, effluence of the charges via the connected pores easily occurs, and even when electretized by the charge injection, a performance decrement with time easily occurs. Also, an elastic modulus of the energy conversion film (i) is extremely deteriorated, and the recovery in the thickness direction is lowered, so that there may be the case where the durability is inferior.

[Expression 1]

$$\text{Porosity (\%)} = (\rho_0 - \rho)/\rho_0 \times 100 \quad (1)$$

($\rho_0$ represents a true density of the resin film; and $\rho$ represents a density of the resin film.)

[Thickness]

As for a thickness of the energy conversion film (i) of the present invention, a total thickness of the film is measured using a thickness gauge in conformity with JIS-K-7130:1999.

A thickness of each of the core layer (A) and the surface layer (B) constituting this is determined as follows. That is, an object sample for measurement is cooled with liquid nitrogen to a temperature of not higher than −60° C.; a razor blade (a trade name: Proline Blade, manufactured by Schick Japan K.K.) is applied at right angles to the sample placed on a glass plate and cuts the sample to fabricate a sample for cross-sectional measurement; the obtained sample is subjected to cross-sectional observation by using a scanning electron microscope (a trade name: JSM-6490, manufactured by JEOL Ltd.), thereby discriminating a boundary line between the core layer (A) and the surface layer (B) from the pore shape and composition/appearance; and the observed thickness is multiplied by the magnification to determine the thickness of the surface layer (B). Subsequently, the thickness of the surface layer (B) is subtracted from the total thickness of the film to determine the thickness of the core layer (A).

[Frequency of Pores]

A pore size of the core layer (A) of the present invention is determined as follows. That is, the sample for cross-sectional observation as fabricated in the foregoing thickness measurement is photographed at a magnification of 500 times by using a scanning electron microscope (a trade name: JSM-6490, manufactured by JEOL Ltd.); images are stuck such that a measured length is 1 mm in width; and pores having a height in the thickness direction of the film of from 3 to 30 μm and a diameter in the plane direction of the film of from 50 to 500 μm through the cross-sectional observation are counted and measured, followed by calculation per unit area.

Incidentally, the measurement of the frequency of pores was performed in the transverse direction and the machine direction of the film, respectively.

[Median Size (D50)]

A median size (D50) of the inorganic powder or the organic filler, or the mixture of the both, which is used in the present invention, is measured by the laser diffraction/scattering method on the basis of JIS-Z-8825-1:2001. Specifically, a dispersion liquid obtained by adding the inorganic powder or the organic filler, or the mixture of the both, in a proportion of 0.2 wt % to a 0.1 wt % sodium hexametaphosphate solution in distilled water and suspending using an ultrasonic disperser was measured using a laser diffraction type particle size distribution analyzer (a trade name: Microtrac MT3000, manufactured by Nikkiso Co., Ltd.).

[Water Vapor Permeability Coefficient]

A water vapor permeability coefficient (g·mm/m²·24 hr) of the energy conversion film (i) of the present invention was determined by measuring a water vapor permeability (g/m²·24 hr) under a condition at a temperature of 40° C. and a relative humidity of 90% by the cup method in conformity with JIS-Z-0208:1976, followed by calculation from the film thickness (mm).

The surface layer (B) of the energy conversion film (i) of the present invention has an effect for insulating the core layer (A) such that the charges accumulated in the core layer (A) do not escape to the outside. In the case where such an effect is low, the water vapor permeability coefficient becomes high, so that the charge holding ability is deteriorated. In the case where the majority of the pores in the energy conversion film (i) of the present invention are interconnected with each other, the water vapor permeability coefficient becomes high, so that the charge holding ability is deteriorated.

The water vapor permeability coefficient of the energy conversion film (i) of the present invention is in the range of from 0.1 to 2.5 g·mm/m²·24 hr, preferably in the range of from 0.2 to 2.0 g·mm/m²·24 hr, and especially preferably in the range of from 0.3 to 1.5 g·mm/m²·24 hr. When the water vapor permeability coefficient of the energy conversion film (i) exceeds 2.5 g·mm/m²·24 hr, a lowering of the chargeability at a high humidity is remarkable, so that the expected performances of the present invention are not exhibited. On the other hand, in view of the fact that a water vapor permeability coefficient of a thermoplastic resin which may be the main component of the energy conversion film (i), for example, a polyolefin based resin, is about 0.1 g/m²·24 hr, it is difficult to manufacture the energy conversion film (i) of less than 0.1 g/m²·24 hr.

[Surface Resistivity Value]

A surface resistivity value (Ω) of the energy conversion film (i) of the present invention is measured under a condition at a temperature of 23° C. and a relative humidity of 50% by using an electrode of the double ring method in conformity with JIS-K-6911:1995.

Also, in the case where an electrically conductive layer (D) is provided on at least one surface of the energy conversion film (i), and the surface resistivity value is less than $1 \times 10^7 \Omega$, this surface resistivity value is a value measured by the four-terminal method in conformity with JIS-K-7194:1994.

In the energy conversion film (i) of the present invention, the surface resistivity on at least one surface thereof is preferably from $1 \times 10^{13}$ to $9 \times 10^{17} \Omega$, and more preferably from $5 \times 10^{13}$ to $5 \times 10^{16} \Omega$.

When the surface resistivity value is less than $1 \times 10^{13} \Omega$, in subjecting the energy conversion film (i) to an electretization treatment, the charges easily escape through the surface, so that the charge injection is not sufficiently performed. When the surface resistivity value exceeds $9 \times 10^{17} \Omega$, it is not preferable because the removal of contaminants or dusts attached to the energy conversion film (i) becomes difficult, in performing the electretization treatment, local discharge easily occurs upon passing therethrough, and partial breakage of the energy conversion film (i) easily occurs.

[Electretization]

The electretized film (ii) of the present invention includes a film obtained by electretizing the energy conversion film (i) of the present invention. The electretized film (ii) of the present invention has a high piezoelectric constant d33 and has excellent electro-mechanical energy conversion properties.

As such an electretization treatment, there are exemplified some treatment methods. For example, a method of holding the both surfaces of the energy conversion film (i) by an electric conductor and applying a direct current high voltage or a pulse-formed high voltage (electretization method), a method of performing electretization upon irradiation with γ-rays or electron beams (radio-electretization method), and the like are known.

Of these, the electretization treatment method adopting direct-current high-voltage discharge (electretization method) is suitable for the electretization treatment of a polymer material such as the energy conversion film (i) of the present invention and thus preferable because not only the apparatus is small-sized, but loads to the operators or environment are small.

Figure 2:
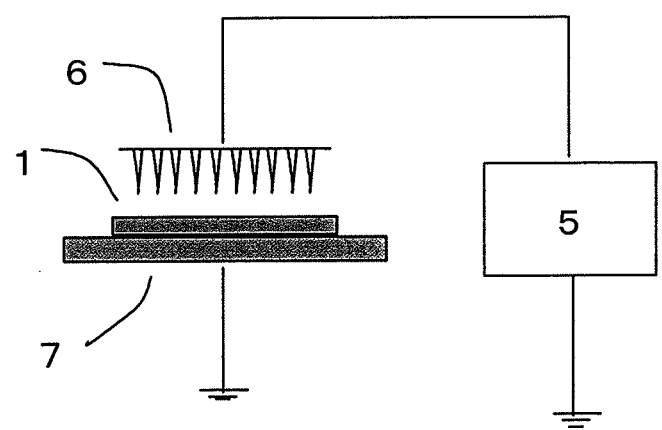
FIG. 2 is a schematic view of an example of a batch electretization apparatus.
Figure 3:
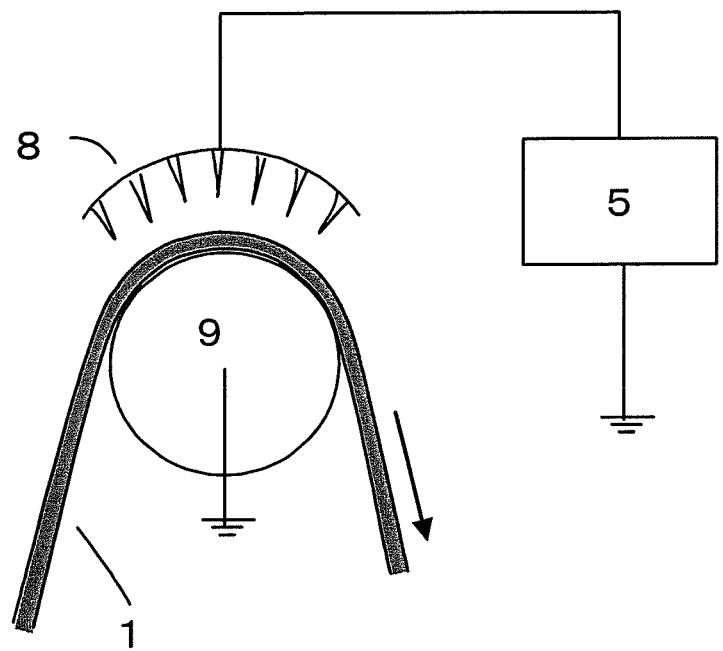
FIG. 3 is a schematic view of an example of a continuous electretization apparatus.
Figure 4:
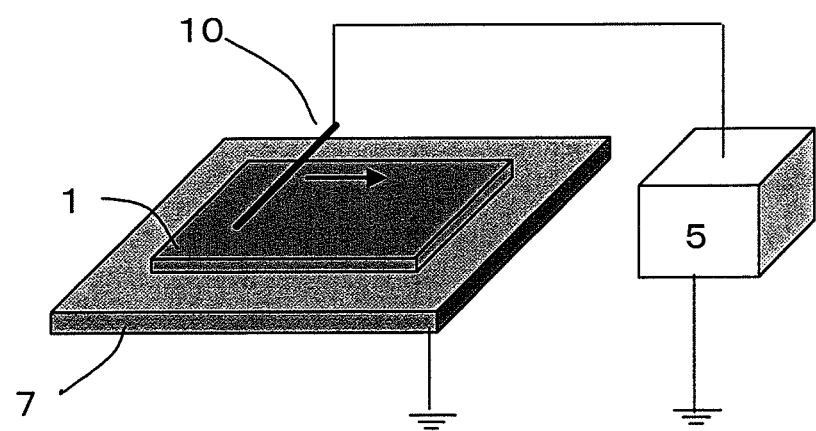
FIG. 4 is a schematic view of an example of a batch electretization apparatus.
Figure 5:
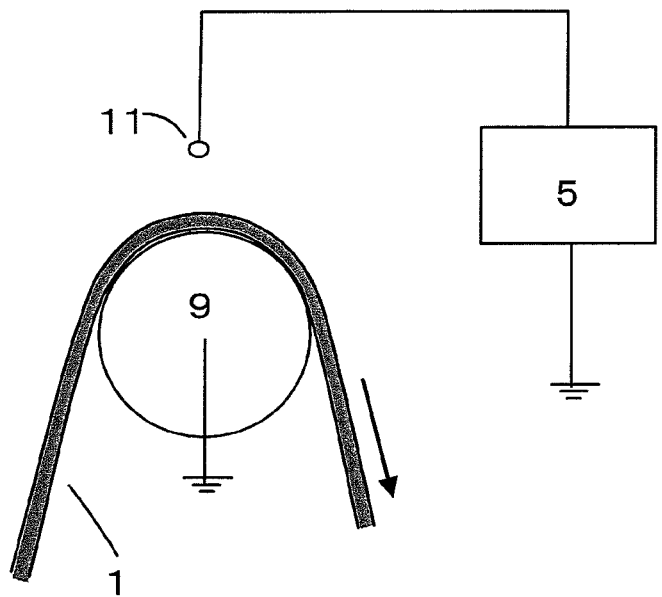
FIG. 5 is a schematic view of an example of a continuous electretization apparatus.

As for preferred examples of the electretization apparatus which can be used in the present invention, there are exemplified a method in which the energy conversion film (i) is fixed between a pin electrode 6 connected to a direct-current high-voltage power source 5 and an earth electrode 7, and a prescribed voltage is applied as shown in FIG. 2; a method in which the energy conversion film (i) is fixed between a wire electrode 10 connected to a direct-current high-voltage power source 5 and an earth electrode 7, and the wire electrode 10 is moved while applying a prescribed voltage as shown in FIG. 4; a method in which the energy conversion film (i) is allowed to pass while applying a prescribed voltage between a pin electrode 8 connected to a direct-current high-voltage power source 5 and a roll 9 connected to an earth as shown in FIG. 3; a method in which the energy conversion film (i) is allowed to pass while applying a prescribed voltage between a wire electrode 11 connected to a direct-current high-voltage power source 5 and a roll 9 connected to an earth as shown in FIG. 5; and the like.

According to the energy conversion film (i) of the present invention, it is possible to accumulate a larger amount of charges in the inside thereof by an electretization treatment by direct-current high-voltage discharge. Though the application voltage of such an electretization treatment may be varied depending upon the thickness and porosity of the energy conversion film (i), the material quality of the resin or filler, the treatment speed, the shape, material quality and size of the electrode to be used, the charge amount of the energy conversion film (i) to be finally obtained, and the like, it is preferably in the range of from 5 to 100 kV, more preferably in the range of from 6 to 70 kV, and still more preferably in the range of from 7 to 50 kV. When the electretization treatment voltage is less than 5 kV, the charge injection amount is insufficient, so that sufficient energy conversion performances tend to be hardly obtained. On the other hand, when it exceeds 100 kV, local spark discharge easily occurs, so that partial breakage such as pinholes, etc. tends to be easily caused in the energy conversion film (i). Also, when it exceeds 100 kV, a current which goes to the earth electrode along an end face of the energy conversion film (i) from the surface thereof is easily generated, so that the electretization efficiency tends to be deteriorated.

In the electretization treatment, there may be the case where excessive charges are injected into the energy conversion film (i). In that case, a discharge phenomenon occurs from the electretized film (ii) after the treatment, so that there may be the case where inconvenience is brought in the subsequent process. For that reason, after the electretization treatment, it is also possible to subject the electretized film (ii) to a static elimination treatment of the excessive charges. By performing the static elimination treatment, it becomes possible to prevent the discharge phenomenon by eliminating the excessively given charges by the electretization treatment from occurring. As such a static elimination treatment, there can be adopted known techniques by a voltage-application type static eliminator (ionizer), a self-discharge type static eliminator, or the like. Though these general static eliminators are able to eliminate the charges on the film surface, they cannot eliminate the charges accumulated in the inside of the core layer (A), especially in the cores. In consequence, the performances of the electretized film (II) are not largely lowered by the static elimination treatment.

It is desirable to perform the electretization treatment at a temperature of a glass transition point temperature of the main thermoplastic resin to be used for the energy conversion film (i) or higher and not higher than a melting point of a crystal part thereof. When the treatment temperature is the glass transition point or higher, the molecular motion of an amorphous portion of the thermoplastic resin is active, and a molecular arrangement suited for the given charges is presented, so that it becomes possible to achieve the electretization treatment with good efficiency. On the other hand, when the treatment temperature exceeds the melting point, the electretized film (ii) per se cannot maintain its structure, so that the expected performances of the present invention are not obtained.

[Piezoelectric Constant d33]

The electretized film (ii) obtained by electretizing the energy conversion film (i) of the present invention is characterized by exhibiting high piezoelectric properties (electro-mechanical energy conversion performances) especially against a stress in the thickness direction. The piezoelectric properties can be confirmed by the measurement of a piezoelectric constant d33. A stress (unit: N) is given to a sample so as to generate expansion and contraction in the thickness direction, a charge (unit: pC) of the sample as generated at that time is measured, and the piezoelectric constant d33 can be determined from a ratio of the generated charge and the given stress.

As for a more specific measurement method of the piezoelectric constant d33, first of all, a sample in which an electrically conductive layer (D) as described later in detail is provided as an electrode on the both surfaces of the electretized film (ii) is fabricated, the electrode of one surface is allowed to work as an earthed electrode, and the electrode of the other surface is connected to a charge sensitive amplifier (19). Subsequently, the sample is placed on an oscillator (14) of a piezoelectric constant measurement apparatus shown in FIG. 6, and an anchor (16) having an acceleration sensor (17)

is placed on the sample. Subsequently, when the oscillator (14) is allowed to oscillate, a dynamic stress is given to the sample by the anchor (16) in the thickness direction. At that time, the dynamic stress can be determined from the product of an acceleration of the oscillator (14) measured from the acceleration sensor (17) and a weight of the anchor (16).

Then, the charges generated by the stress can be determined by outputting them via the charge sensitive amplifier (19), followed by observation using an oscilloscope (20).

The piezoelectric constant d33 of the electretized film (ii) using the energy conversion film (i) of the present invention is usually in the range of from 50 to 1,000 pC/N, preferably from 100 to 700 pC/N, more preferably from 150 to 500 pC/N, and especially preferably from 200 to 350 pC/N. When the piezoelectric constant d33 is less than 50 pC/N, the performances are low, so that an industrial value of the film is low. On the other hand, it is difficult to achieve the case that the d33 exceeds 1,000 pC/N even by adopting the present invention.

[Electrically Conductive Layer (D)]

It is possible to form an energy conversion apparatus material (iii) by providing an electrically conductive layer (D) on at least one surface of the electretized film (ii) obtained by electretizing the energy conversion film (i) of the present invention.

Since the electrically conductive layer (D) is used as an electrode, it is desirable to adjust a surface resistivity value of the surface of the subject layer within the range of from $1 \times 10^{-2}$ to $9 \times 10^{7} \Omega$.

When the surface resistance value exceeds $9 \times 10^{7} \Omega$, the conduction efficiency of electric signals is poor, so that the performances as an electric or electronic input-outputting apparatus material tend to be lowered. On the other hand, in order to provide the electrically conductive layer (D) of less than $1 \times 10^{-2}$, it is necessary to provide the electrically conductive layer (D) thick; the temperature of the energy conversion film (i) elevates by heat at the time of drying in the case of providing the electrically conductive layer (D) by means of coating, or heat of the metal to be vapor deposited in the case of performing vapor deposition; and the pores formed in the inside of the layer collapse, or contraction occurs in the energy conversion film (i) per se, so that there may be the case where the expected performances are not exhibited.

Specific examples of the electrically conductive layer (D) include a coating film obtained by coating an electrically conductive coating, a metal vapor deposited film, and the like. Specific examples of the electrically conductive coating include those obtained by mixing metal particles of gold, silver, platinum, copper, silicon, etc., electrically conductive metal oxide particles of tin-doped indium oxide (ITO), antimony-doped tin oxide (ATO), fluorine-doped tin oxide (FTO), aluminum-doped zinc oxide, etc., or carbon particles with a solution or dispersion liquid of a binder resin component such as polyacrylate, polyurethane, polyepoxy, polyether, polyester, etc.; solutions or dispersion liquids of an electrically conductive resin such as polyaniline, polypyrrole, polythiophene, etc.; and the like.

Coating of the electrically conductive coating can be carried out by a conventionally known coating apparatus. Specific examples of the coating apparatus include a die coater, a bar coater, a comma coater, a lip coater, a roll coater, a curtain coater, a gravure coater, a spray coater, a blade coater, a reverse coater, an air knife coater, and the like.

Specific examples of the metal vapor deposited film include thin films formed by vaporizing a metal such as aluminum, zinc, gold, silver, platinum, nickel, etc. under reduced pressure to vapor deposit it on the surface of the energy conversion film (i); those obtained by transferring a thin film composed of a metal such as aluminum, zinc, gold, silver, platinum, nickel, etc. onto the surface of the energy conversion film (i); and the like.

The installment of the electrically conductive layer (D) on the energy conversion film (i) may be performed before the electretization treatment, or may be performed after the treatment.

By performing the installment of the electrically conductive layer (D) on the electretized film (ii) after the electretization treatment, it is possible to prevent the diffusion of charges via the electrically conductive layer (D) at the time of electretization treatment from occurring. However, in installing the electrically conductive layer (D), loads such as heat, etc. are applied to the electretized film (ii), so that there may be the case where the charges escape, resulting in a lowering of the performances. At present, in view of the performances of the finally obtained energy conversion apparatus material (iii), it is preferable to provide the electrically conductive layer (D) before the electretization treatment.

EXAMPLES

The present invention is hereunder more specifically described by reference to the following Examples, Comparative Examples and Test Examples. Materials, use amounts, proportions, operations, and the like as shown below can be properly changed unless deviated from the spirit of the present invention. In consequence, it should not be construed that the scope of the present invention is limited to the specific examples as described below.

Incidentally, all percentages described below are % by weight unless otherwise indicated.

Materials used in the Preparation Examples, Examples and Comparative Examples of the energy conversion film (i) of the present invention are summarized and shown in Table 1.

TABLE 1

| Material name | Contents |
|---|---|
| Inorganic powder and organic filler | |
| A | Calcium carbonate (a trade name: Softon 1000, manufactured by Bihoku Funka Kogyo Co., Ltd., median size D50: 5.2 μm, density: 2.7 g/cm$^3$) |
| B | Calcium carbonate (a trade name: BF100, manufactured by Bihoku Funka Kogyo Co., Ltd., median size D50: 10.1 μm, density: 2.7 g/cm$^3$) |
| C | Calcium carbonate (a trade name: Softon 1800, manufactured by Bihoku Funka Kogyo Co., Ltd., median size D50: 2.2 μm, density: 2.7 g/cm$^3$) |
| D | Crosslinked acrylic resin particle (a trade name: MR10G, manufactured by Soken Chemical & Engineering Co., Ltd., median size D50: 8.0 μm, density: 1.2 g/cm$^3$) |

TABLE 1-continued

| Material name | Contents |
|---|---|
| E | Crosslinked acrylic resin particle (a trade name: Ganz Pearl GM0401S, manufactured by Ganz Chemical Co., Ltd., median size D50: 4.1 μm, density: 1.2 g/cm$^3$) |
| F | Crosslinked acrylic resin particle (a trade name: Ganz Pearl GM0105, manufactured by Ganz Chemical Co., Ltd., median size D50: 1.8 μm, density: 1.2 g/cm$^3$) |
| G | Mixture of 75 parts by weight of calcium carbonate (a trade name: Softon 1000, manufactured by Bihoku Funka Kogyo Co., Ltd.) and 25 parts by weight of crosslinked acrylic resin particle (a trade name: Ganz Pearl GM0401S, manufactured by Ganz Chemical Co., Ltd.) (median size D50: 4.6 μm, density: 2.1 g/cm$^3$) |
| H | Mixture of 25 parts by weight of calcium carbonate (a trade name: BF100, manufactured by Bihoku Funka Kogyo Co., Ltd.) and 75 parts by weight of crosslinked acrylic resin particle (a trade name: MR10G, manufactured by Soken Chemical & Engineering Co., Ltd.) (median size D50: 8.3 μm, density: 1.4 g/cm$^3$) |
| | Thermoplastic resin |
| Resin 1 | Propylene homopolymer (a trade name: Novatec-PP FY4, manufactured by Japan Polypropylene Corporation, MFR (under a load of 2.16 kg at 230° C.): 5 g/10 min, melting point: 165° C., density: 0.91 g/cm$^3$) |
| Resin 2 | Propylene homopolymer (a trade name: Novatec-PP MA3, manufactured by Japan Polypropylene Corporation, MFR (under a load of 2.16 kg at 230° C.): 11 g/10 min, melting point: 165° C., density: 0.91 g/cm$^3$) |
| Resin 3 | High-density polyethylene (a trade name: Novatec HD HJ360, manufactured by Japan Polyethylene Corporation, MFR (under a load of 2.16 kg at 190° C.): 5.5 g/10 min, melting point: 131° C., density: 0.95 g/cm$^3$) |
| Anchor agent A | Polyaminepolyamide based polymer solution (coating agent prepared by diluting a trade name: WS4042, manufactured by Seiko PMC Corporation (epichlorohydrin adduct solution of polyaminepolyamide having a solids concentration of 25% by weight) with a mixed solution of water/isopropyl alcohol (9/1) to a solids concentration of 1% by weight) |
| Anchor agent B | Polyaminepolyamide based polymer solution (coating agent prepared by diluting a trade name: Polymin SK, manufactured by BASF Coatings Japan Ltd. (ethyleneimine adduct solution of polyaminepolyamide having a solids concentration of 25% by weight) with a mixed solution of water/isopropyl alcohol (9/1) to a solids concentration of 1% by weight) |

Blending Example

Each of resin compositions (a to q) prepared by mixing the thermoplastic resin, the inorganic powder and the organic filler shown in Table 1 in a proportion shown in Table 2 was melt kneaded by a twin-screw mixer set at 210° C. and subsequently extruded in a strand form by an extruder set at 230° C., and after cooling, the resultant was cut by a strand cutter, thereby fabricating pellets of each of the resin compositions (a to q).

Incidentally, each of the inorganic powder G used in the resin composition e and the inorganic powder H used in the resin composition m is a combination of the inorganic powder and the organic filler, and the median size (D50) and the density in the table are values measured as the mixture.

TABLE 2

| Material name | Inorganic powder and organic filler (wt %) | | | | | | | | Thermoplastic resin (wt %) | | |
|---|---|---|---|---|---|---|---|---|---|---|---|
| | A | B | C | D | E | F | G | H | Resin 1 | Resin 2 | Resin 3 |
| Resin composition a | 15 | — | — | — | — | — | — | — | 80 | — | 5 |
| Resin composition b | 20 | — | — | — | — | — | — | — | 70 | — | 10 |
| Resin composition c | — | 20 | — | — | — | — | — | — | 70 | — | 10 |
| Resin composition d | 30 | — | — | — | — | — | — | — | 65 | — | 5 |
| Resin composition e | — | — | — | — | — | — | 20 | — | 70 | — | 10 |
| Resin composition f | — | — | 20 | — | — | — | — | — | 75 | — | 5 |
| Resin composition g | 60 | — | — | — | — | — | — | — | — | 35 | 5 |
| Resin composition h | 6 | — | — | — | — | — | — | — | 89 | — | 5 |
| Resin composition i | — | — | — | 7 | — | — | — | — | 88 | — | 5 |
| Resin composition j | — | — | — | 10 | — | — | — | — | 80 | — | 10 |
| Resin composition k | — | — | — | — | 10 | — | — | — | 80 | — | 10 |
| Resin composition l | — | — | — | 15 | — | — | — | — | 75 | — | 10 |
| Resin composition m | — | — | — | — | — | — | — | 10 | 80 | — | 10 |
| Resin composition n | — | — | — | — | — | 10 | — | — | 85 | — | 5 |
| Resin composition o | — | — | — | 35 | — | — | — | — | 10 | 45 | 10 |
| Resin composition p | — | — | — | 1 | — | — | — | — | 94 | — | 5 |
| Resin composition q | — | — | — | — | — | — | — | — | 100 | — | — |

Example 1

The resin composition a working as the core layer (A) and the resin composition q working as the surface layer (B) were each melt kneaded by three extruders set at 230° C., then fed into a multi-layered die of the feed block type set at 250° C., laminated within the die in the order of q/a/q, and extruded into a sheet form, which was then cooled to 60° C. by a cooling apparatus to obtain a non-stretched sheet of a three-layered constitution.

This non-stretched sheet was heated at 135° C. and stretched 5 times in the machine direction (MD) by utilizing a difference in the peripheral speed of a group of rolls. Subsequently, this uniaxially stretched sheet was cooled to 60° C., again heated at 155° C. by using a tenter oven, stretched 8 times in the transverse direction (TD), and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.05 g/m$^2$, and the coated film was dried by an oven at 80° C. to provide an anchor coat layer (C), thereby obtaining a thermoplastic resin stretched film of a three-layered structure [thickness of each layer (1/48/1 μm), number of stretching axes of each layer (two axes/two axes/two axes)].

The obtained film had a thickness of 50 μm, a porosity of 39%, a water vapor permeability coefficient of 0.30 g·mm/m$^2$·24 hr, and a surface resistivity value of the order of $10^{13}$Ω on the both surfaces. Also, the cross-sectional observation of the film revealed that the measured number of pores having a size specified in the present invention as generated in the core layer (A) was 417 pores/mm$^2$ in the machine direction of the film and 646 pores/mm$^2$ in the transverse direction of the film, respectively. These measurement results are shown in Table 3 or 4.

Example 2

The resin composition b working as the core layer (A) and the resin composition q working as the surface layer (B) were each melt kneaded by three extruders set at 230° C., then fed into a multi-layered die of the feed block type set at 250° C., laminated within the die in the order of q/b/q, and extruded into a sheet form, which was then cooled to 60° C. by a cooling apparatus to obtain a non-stretched sheet of a three-layered constitution.

This non-stretched sheet was heated at 135° C. and stretched 5 times in the machine direction by utilizing a difference in the peripheral speed of a group of rolls. Subsequently, this uniaxially stretched sheet was cooled to 60° C., again heated at 155° C. by using a tenter oven, stretched 8 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.05 g/m$^2$, and the coated film was dried by an oven at 80° C. to provide an anchor coat layer (C), thereby obtaining a thermoplastic resin stretched film of a three-layered structure [thickness of each layer (2/66/2 μm), number of stretching axes of each layer (two axes/two axes/two axes)].

The obtained film had a thickness of 70 μm, a porosity of 52%, a water vapor permeability coefficient of 0.46 g·mm/m$^2$·24 hr, and a surface resistivity value of the order of $10^{13}$Ω on the both surfaces. Also, the cross-sectional observation of the film revealed that the measured number of pores having a size specified in the present invention as generated in the core layer (A) was 652 pores/mm$^2$ in the machine direction of the film and 1,045 pores/mm$^2$ in the transverse direction of the film, respectively. These measurement results are shown in Table 3 or 4.

Example 3

The resin composition c working as the core layer (A) and the resin composition q working as the surface layer (B) were each melt kneaded by three extruders set at 230° C., then fed into a multi-layered die of the feed block type set at 250° C., laminated within the die in the order of q/c/q, and extruded into a sheet form, which was then cooled to 60° C. by a cooling apparatus to obtain a non-stretched sheet of a three-layered constitution.

This non-stretched sheet was heated at 145° C. and stretched 4.5 times in the machine direction by utilizing a difference in the peripheral speed of a group of rolls. Subsequently, this uniaxially stretched sheet was cooled to 60° C., again heated at 155° C. by using a tenter oven, stretched 9 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent B shown in Table 1 was coated on the both surfaces of the film by using a squeeze coater such that each of the coating amounts after drying was 0.02 g/m$^2$, and the coated film was dried by an oven at 80° C. to provide an anchor coat layer (C), thereby obtaining a thermoplastic resin stretched film of a three-layered structure [thickness of each layer (2/76/2 μm), number of stretching axes of each layer (two axes/two axes/two axes)].

The obtained film had a thickness of 80 μm, a porosity of 46%, a water vapor permeability coefficient of 0.42 g·m/m$^2$·24 hr, and a surface resistivity value of the order of $10^{14}$Ω on the both surfaces. Also, the cross-sectional observation of the film revealed that the measured number of pores having a size specified in the present invention as generated in the core layer (A) was 487 pores/mm$^2$ in the machine direction of the film and 1,066 pores/mm$^2$ in the transverse direction of the film, respectively. These measurement results are shown in Table 3 or 4.

Example 4

The resin composition d working as the core layer (A) and the resin composition q working as the surface layer (B) were each melt kneaded by three extruders set at 230° C., then fed into a multi-layered die of the feed block type set at 250° C., laminated within the die in the order of q/d/q, and extruded into a sheet form, which was then cooled to 60° C. by a cooling apparatus to obtain a non-stretched sheet of a three-layered constitution.

This non-stretched sheet was heated at 140° C. and stretched 4 times in the machine direction by utilizing a difference in the peripheral speed of a group of rolls. Subsequently, this uniaxially stretched sheet was cooled to 60° C., again heated at 155° C. by using a tenter oven, stretched 9 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent B shown in Table 1 was coated on the both surfaces of the film by using a squeeze coater such that each of the coating amounts after drying was 0.02 g/m$^2$, and the coated film was dried by an oven at 80° C. to provide an anchor coat layer (C), thereby obtaining a thermoplastic resin stretched film of a three-layered structure [thickness of each layer (5/140/5 μm), number of stretching axes of each layer (two axes/two axes/two axes)].

The obtained film had a thickness of 150 μm, a porosity of 68%, a water vapor permeability coefficient of 0.59 g·m/m$^2$·24 hr, and a surface resistivity value of the order of 10$^{14}$ Ω on the both surfaces. Also, the cross-sectional observation of the film revealed that the measured number of pores having a size specified in the present invention as generated in the core layer (A) was 386 pores/mm$^2$ in the machine direction of the film and 1,231 pores/mm$^2$ in the transverse direction of the film, respectively. These measurement results are shown in Table 3 or 4.

Example 5

The resin composition b and the resin composition q were each melt kneaded by two extruders set at 230° C., then fed into a multi-layered die of the feed block type set at 250° C., laminated within the die, and extruded into a sheet form, which was then cooled to 60° C. by a cooling apparatus to obtain a non-stretched sheet of a two-layered constitution.

This non-stretched sheet was heated at 135° C. and stretched 5 times in the machine direction by utilizing a difference in the peripheral speed of a group of rolls. Subsequently, the resin composition b was melt kneaded by another extruder set at 250° C., then extruded into a sheet form from an extrusion die and laminated on the surface of the above-prepared uniaxially stretched film on the side of the resin composition b, thereby obtaining a laminated film of a three-layered structure. Subsequently, this laminated film of a three-layered structure was cooled to 60° C., again heated at 150° C. by using a tenter oven, stretched 8 times in the transverse direction, and then further heated to 160° C. by an oven, thereby performing an annealing treatment.

Subsequently, the resultant was cooled to 60° C., and an edge part thereof was slit, and thereafter, the both surfaces of the film were subsequently subjected to a corona surface discharge treatment. The anchor agent A shown in Table 1 was coated on the both surfaces of the film by using a squeeze coater such that each of the coating amounts after drying was 0.01 g/m$^2$, and the coated film was dried by an oven at 80° C. to provide an anchor coat layer (C), thereby obtaining a thermoplastic resin stretched film of a three-layered structure [q/b/b, thickness of each layer (2/50/15 μm), number of stretching axes of each layer (two axes/two axes/one axis)].

The obtained film had a thickness of 67 μm, a porosity of 44%, a water vapor permeability coefficient of 0.37 g·mm/m$^2$·24 hr, and a surface resistivity value of the order of 10$^{14}$ Ω on the both surfaces. Also, the cross-sectional observation of the film revealed that the measured number of pores having a size specified in the present invention as generated in the core layer (A) was 840 pores/mm$^2$ in the machine direction of the film and 860 pores/mm$^2$ in the transverse direction of the film, respectively. These measurement results are shown in Table 3 or 4.

Example 6

The resin composition b was melt kneaded by an extruder set at 230° C., then fed into an extrusion die set at 250° C., and extruded into a sheet form, which was then cooled to 60° C. by a cooling apparatus to obtain a non-stretched sheet.

This non-stretched sheet was heated at 130° C. and stretched 5 times in the machine direction by utilizing a difference in the peripheral speed of a group of rolls. Subsequently, the resin composition b was melt kneaded by two extruders set at 250° C., then extruded into a sheet form from an extrusion die and laminated on the both surfaces of the above-prepared uniaxially stretched film, thereby obtaining a laminated film of a three-layered structure. Subsequently, this laminated film of a three-layered structure was cooled to 60° C., again heated at 150° C. by using a tenter oven, stretched 8 times in the transverse direction, and then further heated to 160° C. by an oven, thereby performing an annealing treatment.

Subsequently, the resultant was cooled to 60° C., and an edge part thereof was slit, and thereafter, the both surfaces of the film were subsequently subjected to a corona surface discharge treatment. The anchor agent A shown in Table 1 was coated on the both surfaces of the film by using a squeeze coater such that each of the coating amounts after drying was 0.01 g/m$^2$, and the coated film was dried by an oven at 80° C. to provide an anchor coat layer (C), thereby obtaining a thermoplastic resin stretched film of a three-layered structure [b/b/b, thickness of each layer (10/70/10 μm), number of stretching axes of each layer (one axis/two axes/one axis)].

The obtained film had a thickness of 90 μm, a porosity of 47%, a water vapor permeability coefficient of 0.35 g·mm/m$^2$·24 hr, and a surface resistivity value of the order of 10$^{15}$ Ω on the both surfaces. Also, the cross-sectional observation of the film revealed that the measured number of pores having a size specified in the present invention as generated in the core layer (A) was 757 pores/mm$^2$ in the machine direction of the film and 929 pores/mm$^2$ in the transverse direction of the film, respectively. These measurement results are shown in Table 3 or 4.

Example 7

The resin composition c was melt kneaded by an extruder set at 230° C., then fed into an extrusion die set at 250° C., and extruded into a sheet form, which was then cooled to 60° C. by a cooling apparatus to obtain a non-stretched sheet.

This non-stretched sheet was heated at 140° C. and stretched 4.5 times in the machine direction by utilizing a difference in the peripheral speed of a group of rolls. Subsequently, the resin composition q was melt kneaded by two extruders set at 250° C., then extruded into a sheet form from an extrusion die and laminated on the both surfaces of the above-prepared uniaxially stretched film, thereby obtaining a laminated film of a three-layered structure. Subsequently, this laminated film of a three-layered structure was cooled to 60° C., again heated at 155° C. by using a tenter oven, stretched 8.5 times in the transverse direction, and then further heated to 160° C. by an oven, thereby performing an annealing treatment.

Subsequently, the resultant was cooled to 60° C., and an edge part thereof was slit, and thereafter, the both surfaces of the film were subsequently subjected to a corona surface discharge treatment. The anchor agent A shown in Table 1 was coated on the both surfaces of the film by using a squeeze coater such that each of the coating amounts after drying was 0.02 g/m², and the coated film was dried by an oven at 80° C. to provide an anchor coat layer (C), thereby obtaining a thermoplastic resin stretched film of a three-layered structure [q/c/q, thickness of each layer (10/70/10 μm), number of stretching axes of each layer (one axis/two axes/one axis)].

The obtained film had a thickness of 90 μm, a porosity of 37%, a water vapor permeability coefficient of 0.32 g·m/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 657 pores/mm² in the machine direction of the film and 1,129 pores/mm² in the transverse direction of the film, respectively. These measurement results are shown in Table 3 or 4.

Example 8

The resin composition e working as the core layer (A) and the resin composition q working as the surface layer (B) were each melt kneaded by three extruders set at 230° C., then fed into a multi-layered die of the feed block type set at 250° C., laminated within the die in the order of q/e/q, and extruded into a sheet form, which was then cooled to 60° C. by a cooling apparatus to obtain a non-stretched sheet of a three-layered constitution.

This non-stretched sheet was heated at 135° C. and stretched 5 times in the machine direction by utilizing a difference in the peripheral speed of a group of rolls. Subsequently, this uniaxially stretched sheet was cooled to 60° C., again heated at 155° C. by using a tenter oven, stretched 8 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.02 g/m², and the coated film was dried by an oven at 80° C. to provide an anchor coat layer (C), thereby obtaining a thermoplastic resin stretched film of a three-layered structure [thickness of each layer (2/66/2 μm), number of stretching axes of each layer (two axes/two axes/two axes)].

The obtained film had a thickness of 70 μm, a porosity of 48%, a water vapor permeability coefficient of 0.40 g·mm/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 788 pores/mm² in the machine direction of the film and 818 pores/mm² in the transverse direction of the film, respectively. These measurement results are shown in Table 3 or 4.

Example 9

The resin composition i working as the core layer (A) and the resin composition q working as the surface layer (B) were each melt kneaded by three extruders set at 230° C., then fed into a multi-layered die of the feed block type set at 250° C., laminated within the die in the order of q/i/q, and extruded into a sheet form, which was then cooled to 60° C. by a cooling apparatus to obtain a non-stretched sheet of a three-layered constitution.

This non-stretched sheet was heated at 140° C. and stretched 4 times in the machine direction (MD) by utilizing a difference in the peripheral speed of a group of rolls. Subsequently, this uniaxially stretched sheet was cooled to 60° C., again heated at 150° C. by using a tenter oven, stretched 8 times in the transverse direction (TD), and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.03 g/m², and the coated film was dried by an oven at 80° C. to provide an anchor coat layer (C), thereby obtaining a thermoplastic resin stretched film of a three-layered structure [thickness of each layer (1/48/1 μm), number of stretching axes of each layer (two axes/two axes/two axes)].

The obtained film had a thickness of 50 μm, a porosity of 37%, a water vapor permeability coefficient of 0.21 g·mm/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 354 pores/mm² in the machine direction of the film and 521 pores/mm² in the transverse direction of the film, respectively. These measurement results are shown in Table 3 or 4.

Example 10

The resin composition j working as the core layer (A) and the resin composition q working as the surface layer (B) were each melt kneaded by three extruders set at 230° C., then fed into a multi-layered die of the feed block type set at 250° C., laminated within the die in the order of q/j/q, and extruded into a sheet form, which was then cooled to 60° C. by a cooling apparatus to obtain a non-stretched sheet of a three-layered constitution.

This non-stretched sheet was heated at 140° C. and stretched 5 times in the machine direction by utilizing a difference in the peripheral speed of a group of rolls. Subsequently, this uniaxially stretched sheet was cooled to 60° C., again heated at 150° C. by using a tenter oven, stretched 8.5 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.03 g/m², and the coated film was dried by an oven at 80° C. to provide an anchor coat layer (C), thereby obtaining a thermoplastic resin stretched film of a three-layered structure [thickness of each layer (1/58/1 μm), number of stretching axes of each layer (two axes/two axes/two axes)].

The obtained film had a thickness of 60 μm, a porosity of 61%, a water vapor permeability coefficient of 0.33 g·mm/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 831 pores/mm$^2$ in the machine direction of the film and 1,003 pores/mm$^2$ in the transverse direction of the film, respectively. These measurement results are shown in Table 3 or 4.

Example 11

The resin composition k working as the core layer (A) and the resin composition q working as the surface layer (B) were each melt kneaded by three extruders set at 230° C., then fed into a multi-layered die of the feed block type set at 250° C., laminated within the die in the order of q/k/q, and extruded into a sheet form, which was then cooled to 60° C. by a cooling apparatus to obtain a non-stretched sheet of a three-layered constitution.

This non-stretched sheet was heated at 145° C. and stretched 4.5 times in the machine direction by utilizing a difference in the peripheral speed of a group of rolls. Subsequently, this uniaxially stretched sheet was cooled to 60° C., again heated at 150° C. by using a tenter oven, stretched 9 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.05 g/m$^2$, and the coated film was dried by an oven at 80° C. to provide an anchor coat layer (C), thereby obtaining a thermoplastic resin stretched film of a three-layered structure [thickness of each layer (2/56/2 µm), number of stretching axes of each layer (two axes/two axes/two axes)].

The obtained film had a thickness of 60 µm, a porosity of 44%, a water vapor permeability coefficient of 0.27 g·mm/m$^2$·24 hr, and a surface resistivity value of the order of $10^{13}$Ω on the both surfaces. Also, the cross-sectional observation of the film revealed that the measured number of pores having a size specified in the present invention as generated in the core layer (A) was 750 pores/mm$^2$ in the machine direction of the film and 981 pores/mm$^2$ in the transverse direction of the film, respectively. These measurement results are shown in Table 3 or 4.

Example 12

The resin composition 1 working as the core layer (A) and the resin composition q working as the surface layer (B) were each melt kneaded by three extruders set at 230° C., then fed into a multi-layered die of the feed block type set at 250° C., laminated within the die in the order of q/l/q, and extruded into a sheet form, which was then cooled to 60° C. by a cooling apparatus to obtain a non-stretched sheet of a three-layered constitution.

This non-stretched sheet was heated at 145° C. and stretched 4 times in the machine direction by utilizing a difference in the peripheral speed of a group of rolls. Subsequently, this uniaxially stretched sheet was cooled to 60° C., again heated at 155° C. by using a tenter oven, stretched 9 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.02 g/m$^2$, and the coated film was dried by an oven at 80° C. to provide an anchor coat layer (C), thereby obtaining a thermoplastic resin stretched film of a three-layered structure [thickness of each layer (5/120/5 µm), number of stretching axes of each layer (two axes/two axes/two axes)].

The obtained film had a thickness of 130 µm, a porosity of 65%, a water vapor permeability coefficient of 0.49 g·mm/m$^2$·24 hr, and a surface resistivity value of the order of $10^{15}$Ω on the both surfaces. Also, the cross-sectional observation of the film revealed that the measured number of pores having a size specified in the present invention as generated in the core layer (A) was 542 pores/mm$^2$ in the machine direction of the film and 1,488 pores/mm$^2$ in the transverse direction of the film, respectively. These measurement results are shown in Table 3 or 4.

Example 13

The resin composition j and the resin composition q were each melt kneaded by two extruders set at 230° C., then fed into a multi-layered die of the feed block type set at 250° C., laminated within the die, and extruded into a sheet form, which was then cooled to 60° C. by a cooling apparatus to obtain a non-stretched sheet of a two-layered constitution.

This non-stretched sheet was heated at 135° C. and stretched 5 times in the machine direction by utilizing a difference in the peripheral speed of a group of rolls. Subsequently, the resin composition j was melt kneaded by another extruder set at 250° C., then extruded into a sheet form from an extrusion die and laminated on the surface of the above-prepared uniaxially stretched film on the side of the resin composition j, thereby obtaining a laminated film of a three-layered structure. Subsequently, this laminated film of a three-layered structure was cooled to 60° C., again heated at 150° C. by using a tenter oven, stretched 8.5 times in the transverse direction, and then further heated to 160° C. by an oven, thereby performing an annealing treatment.

Subsequently, the resultant was cooled to 60° C., and an edge part thereof was slit, and thereafter, the both surfaces of the film were subsequently subjected to a corona surface discharge treatment. The anchor agent B shown in Table 1 was coated on the both surfaces of the film by using a squeeze coater such that each of the coating amounts after drying was 0.02 g/m$^2$, and the coated film was dried by an oven at 80° C. to provide an anchor coat layer (C), thereby obtaining a thermoplastic resin stretched film of a three-layered structure [q/j/j, thickness of each layer (1/55/14 µm), number of stretching axes of each layer (two axes/two axes/one axis)].

The obtained film had a thickness of 70 µm, a porosity of 52%, a water vapor permeability coefficient of 0.34 g·mm/m$^2$·24 hr, and a surface resistivity value of the order of $10^{14}$Ω on the both surfaces. Also, the cross-sectional observation of the film revealed that the measured number of pores having a size specified in the present invention as generated in the core layer (A) was 1,055 pores/mm$^2$ in the machine direction of the film and 1,406 pores/mm$^2$ in the transverse direction of the film, respectively. These measurement results are shown in Table 3 or 4.

Example 14

The resin composition j was melt kneaded by an extruder set at 230° C., then fed into an extrusion die set at 250° C., and extruded into a sheet form, which was then cooled to 60° C. by a cooling apparatus to obtain a non-stretched sheet.

This non-stretched sheet was heated at 140° C. and stretched 5 times in the machine direction by utilizing a difference in the peripheral speed of a group of rolls. Subsequently, the resin composition j was melt kneaded by two extruders set at 250° C., then extruded into a sheet form from an extrusion die and laminated on the both surfaces of the above-prepared uniaxially stretched film, thereby obtaining a laminated film of a three-layered structure. Subsequently, this laminated film of a three-layered structure was cooled to 60° C., again heated at 155° C. by using a tenter oven, stretched 9 times in the transverse direction, and then further heated to 160° C. by an oven, thereby performing an annealing treatment.

Subsequently, the resultant was cooled to 60° C., and an edge part thereof was slit, and thereafter, the both surfaces of the film were subsequently subjected to a corona surface discharge treatment. The anchor agent B shown in Table 1 was coated on the both surfaces of the film by using a squeeze coater such that each of the coating amounts after drying was 0.01 g/m², and the coated film was dried by an oven at 80° C. to provide an anchor coat layer (C), thereby obtaining a thermoplastic resin stretched film of a three-layered structure [j/j/j, thickness of each layer (15/60/15 µm), number of stretching axes of each layer (one axis/two axes/one axis)].

The obtained film had a thickness of 90 µm, a porosity of 46%, a water vapor permeability coefficient of 0.23 g·mm/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 700 pores/mm² in the machine direction of the film and 989 pores/mm² in the transverse direction of the film, respectively. These measurement results are shown in Table 3 or 4.

Example 15

The resin composition k was melt kneaded by an extruder set at 230° C., then fed into an extrusion die set at 250° C., and extruded into a sheet form, which was then cooled to 60° C. by a cooling apparatus to obtain a non-stretched sheet.

This non-stretched sheet was heated at 140° C. and stretched 4.5 times in the machine direction by utilizing a difference in the peripheral speed of a group of rolls. Subsequently, the resin composition q was melt kneaded by two extruders set at 250° C., then extruded into a sheet form from an extrusion die and laminated on the both surfaces of the above-prepared uniaxially stretched film, thereby obtaining a laminated film of a three-layered structure. Subsequently, this laminated film of a three-layered structure was cooled to 60° C., again heated at 155° C. by using a tenter oven, stretched 8.5 times in the transverse direction, and then further heated to 160° C. by an oven, thereby performing an annealing treatment.

Subsequently, the resultant was cooled to 60° C., and an edge part thereof was slit, and thereafter, the both surfaces of the film were subsequently subjected to a corona surface discharge treatment. The anchor agent B shown in Table 1 was coated on the both surfaces of the film by using a squeeze coater such that each of the coating amounts after drying was 0.02 g/m², and the coated film was dried by an oven at 80° C. to provide an anchor coat layer (C), thereby obtaining a thermoplastic resin stretched film of a three-layered structure [q/k/q, thickness of each layer (15/65/15 µm), number of stretching axes of each layer (one axis/two axes/one axis)].

The obtained film had a thickness of 95 µm, a porosity of 34%, a water vapor permeability coefficient of 0.21 g·mm/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 1,000 pores/mm² in the machine direction of the film and 839 pores/mm² in the transverse direction of the film, respectively. These measurement results are shown in Table 3 or 4.

Example 16

The resin composition m working as the core layer (A) and the resin composition q working as the surface layer (B) were each melt kneaded by three extruders set at 230° C., then fed into a multi-layered die of the feed block type set at 250° C., laminated within the die in the order of q/m/q, and extruded into a sheet form, which was then cooled to 60° C. by a cooling apparatus to obtain a non-stretched sheet of a three-layered constitution.

This non-stretched sheet was heated at 135° C. and stretched 5 times in the machine direction by utilizing a difference in the peripheral speed of a group of rolls. Subsequently, this uniaxially stretched sheet was cooled to 60° C., again heated at 150° C. by using a tenter oven, stretched 8 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent B shown in Table 1 was coated on the both surfaces of the film by using a squeeze coater such that each of the coating amounts after drying was 0.02 g/m², and the coated film was dried by an oven at 80° C. to provide an anchor coat layer (C), thereby obtaining a thermoplastic resin stretched film of a three-layered structure [thickness of each layer (1/73/1 µm), number of stretching axes of each layer (two axes/two axes/two axes)].

The obtained film had a thickness of 75 µm, a porosity of 53%, a water vapor permeability coefficient of 0.42 g·mm/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 1,342 pores/mm² in the machine direction of the film and 1,443 pores/mm² in the transverse direction of the film, respectively. These measurement results are shown in Table 3 or 4.

Comparative Example 1

The resin composition f working as the core layer (A) and the resin composition q working as the surface layer (B) were each melt kneaded by three extruders set at 230° C., then fed into a multi-layered die of the feed block type set at 250° C., laminated within the die in the order of q/f/q, and extruded into a sheet form, which was then cooled to 60° C. by a cooling apparatus to obtain a non-stretched sheet of a three-layered constitution.

This non-stretched sheet was heated at 135° C. and stretched 5 times in the machine direction by utilizing a difference in the peripheral speed of a group of rolls. Subsequently, this uniaxially stretched sheet was cooled to 60° C., again heated at 155° C. by using a tenter oven, stretched 8 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.05 g/m², and the coated film was dried by an oven at 80° C. to provide an anchor coat layer (C), thereby obtaining a thermoplastic resin stretched film of a three-layered structure [thickness of each layer (1/48/1 μm), number of stretching axes of each layer (two axes/two axes/two axes)].

The obtained film had a thickness of 50 μm, a porosity of 40%, a water vapor permeability coefficient of 0.58 g·mm/m²·24 hr, and a surface resistivity value of the order of $10^{13}\Omega$ on the both surfaces. Also, the cross-sectional observation of the film revealed that the measured number of pores having a size specified in the present invention as generated in the core layer (A) was 75 pores/mm² in the machine direction of the film and 208 pores/mm² in the transverse direction of the film, respectively. These measurement results are shown in Table 3 or 4.

Comparative Example 2

The resin composition g working as the core layer (A) and the resin composition q working as the surface layer (B) were each melt kneaded by three extruders set at 230° C., then fed into a multi-layered die of the feed block type set at 250° C., laminated within the die in the order of q/g/q, and extruded into a sheet form, which was then cooled to 60° C. by a cooling apparatus to obtain a non-stretched sheet of a three-layered constitution.

This non-stretched sheet was heated at 135° C. and stretched 3.5 times in the machine direction by utilizing a difference in the peripheral speed of a group of rolls. Subsequently, this uniaxially stretched sheet was cooled to 60° C., again heated at 160° C. by using a tenter oven, stretched 8 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.05 g/m², and the coated film was dried by an oven at 80° C. to provide an anchor coat layer (C), thereby obtaining a thermoplastic resin stretched film of a three-layered structure [thickness of each layer (2/66/2 μm), number of stretching axes of each layer (two axes/two axes/two axes)].

The obtained film had a thickness of 70 μm, a porosity of 73%, a water vapor permeability coefficient of 2.31 g·mm/m²·24 hr, and a surface resistivity value of the order of $10^{13}\Omega$ on the both surfaces. Also, the cross-sectional observation of the film revealed that the measured number of pores having a size specified in the present invention as generated in the core layer (A) was 530 pores/mm² in the machine direction of the film and 2,197 pores/mm² in the transverse direction of the film, respectively. These measurement results are shown in Table 3 or 4.

Comparative Example 3

The resin composition h working as the core layer (A) and the resin composition q working as the surface layer (B) were each melt kneaded by three extruders set at 230° C., then fed into a multi-layered die of the feed block type set at 250° C., laminated within the die in the order of q/h/q, and extruded into a sheet form, which was then cooled to 60° C. by a cooling apparatus to obtain a non-stretched sheet of a three-layered constitution.

This non-stretched sheet was heated at 135° C. and stretched 4 times in the machine direction by utilizing a difference in the peripheral speed of a group of rolls. Subsequently, this uniaxially stretched sheet was cooled to 60° C., again heated at 155° C. by using a tenter oven, stretched 8 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.05 g/m², and the coated film was dried by an oven at 80° C. to provide an anchor coat layer (C), thereby obtaining a thermoplastic resin stretched film of a three-layered structure [thickness of each layer (1/48/1 μm), number of stretching axes of each layer (two axes/two axes/two axes)].

The obtained film had a thickness of 50 μm, a porosity of 14%, a water vapor permeability coefficient of 0.20 g·mm/m²·24 hr, and a surface resistivity value of the order of $10^{13}\Omega$ on the both surfaces. Also, the cross-sectional observation of the film revealed that the measured number of pores having a size specified in the present invention as generated in the core layer (A) was 188 pores/mm² in the machine direction of the film and 313 pores/mm² in the transverse direction of the film, respectively. These measurement results are shown in Table 3 or 4.

Comparative Example 4

The resin composition n working as the core layer (A) and the resin composition q working as the surface layer (B) were each melt kneaded by three extruders set at 230° C., then fed into a multi-layered die of the feed block type set at 250° C., laminated within the die in the order of q/n/q, and extruded into a sheet form, which was then cooled to 60° C. by a cooling apparatus to obtain a non-stretched sheet of a three-layered constitution.

This non-stretched sheet was heated at 130° C. and stretched 5 times in the machine direction by utilizing a difference in the peripheral speed of a group of rolls. Subsequently, this uniaxially stretched sheet was cooled to 60° C., again heated at 150° C. by using a tenter oven, stretched 9 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.03 g/m², and the coated film was dried by an oven at 80° C. to provide an anchor coat layer (C), thereby obtaining a thermoplastic resin stretched film of a three-layered structure [thickness of each layer (1/48/1 μm), number of stretching axes of each layer (two axes/two axes/two axes)].

The obtained film had a thickness of 50 μm, a porosity of 13%, a water vapor permeability coefficient of 0.19 g·m/ m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 21 pores/mm² in the machine direction of the film and 73 pores/mm² in the transverse direction of the film, respectively. These measurement results are shown in Table 3 or 4.

Comparative Example 5

The resin composition o working as the core layer (A) and the resin composition q working as the surface layer (B) were each melt kneaded by three extruders set at 230° C., then fed into a multi-layered die of the feed block type set at 250° C., laminated within the die in the order of q/o/q, and extruded into a sheet form, which was then cooled to 60° C. by a cooling apparatus to obtain a non-stretched sheet of a three-layered constitution.

This non-stretched sheet was heated at 150° C. and stretched 4 times in the machine direction by utilizing a difference in the peripheral speed of a group of rolls. Subsequently, this uniaxially stretched sheet was cooled to 60° C., again heated at 155° C. by using a tenter oven, stretched 8 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.03 g/m², and the coated film was dried by an oven at 80° C. to provide an anchor coat layer (C), thereby obtaining a thermoplastic resin stretched film of a three-layered structure [thickness of each layer (2/86/2 μm), number of stretching axes of each layer (two axes/two axes/two axes)].

The obtained film had a thickness of 90 μm, a porosity of 75%, a water vapor permeability coefficient of 4.14 g·m/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 767 pores/mm² in the machine direction of the film and 2,275 pores/mm² in the transverse direction of the film, respectively. These measurement results are shown in Table 3 or 4.

Comparative Example 6

The resin composition p working as the core layer (A) and the resin composition q working as the surface layer (B) were each melt kneaded by three extruders set at 230° C., then fed into a multi-layered die of the feed block type set at 250° C., laminated within the die in the order of q/p/q, and extruded into a sheet form, which was then cooled to 60° C. by a cooling apparatus to obtain a non-stretched sheet of a three-layered constitution.

This non-stretched sheet was heated at 135° C. and stretched 5 times in the machine direction by utilizing a difference in the peripheral speed of a group of rolls. Subsequently, this uniaxially stretched sheet was cooled to 60° C., again heated at 150° C. by using a tenter oven, stretched 9 times in the transverse direction, and then further heated to 160° C. by an oven, thereby performing an annealing treatment.

Subsequently, the resultant was cooled to 60° C., an edge part thereof was slit, and the both surfaces of the residue were then subjected to a corona surface discharge treatment. The anchor agent A shown in Table 1 was coated on the both surfaces of the film by using a squeeze coater such that each of the coating amounts after drying was 0.03 g/m², and the coated film was dried by an oven at 80° C. to provide an anchor coat layer (C), thereby obtaining a thermoplastic resin stretched film of a three-layered structure [thickness of each layer (1/48/1 μm), number of stretching axes of each layer (two axes/two axes/two axes)].

The obtained film had a thickness of 50 μm, a porosity of 8%, a water vapor permeability coefficient of 0.20 g·mm/m²·24 hr, and a surface resistivity value of the order of $10^{14}\Omega$ on the both surfaces. Also, the cross-sectional observation of the film revealed that the measured number of pores having a size specified in the present invention as generated in the core layer (A) was 83 pores/mm² in the machine direction of the film and 149 pores/mm² in the transverse direction of the film, respectively. These measurement results are shown in Table 3 or 4.

TABLE 3

| | Layer constitution of energy conversion film (i) | | Thickness | Stretching condition | | | | Anchor coat agent | | |
|---|---|---|---|---|---|---|---|---|---|---|
| | | | | MD | | TD | | | Coating | |
| | Resin composition | Constitution of stretched layer | (thickness of each layer) (μm) | Temperature (° C.) | Magnification (times) | Temperature (° C.) | Magnification (times) | Kind | amount (g/m²) | Porosity (%) |
| Example 1 | q/a/q | 2 axes/2 axes/2 axes | 50 (1/48/1) | 135 | 5 | 155 | 8 | A | 0.05 | 39 |
| Example 2 | q/b/q | 2 axes/2 axes/2 axes | 70 (2/66/2) | 135 | 5 | 155 | 8 | A | 0.05 | 52 |
| Example 3 | q/c/q | 2 axes/2 axes/2 axes | 80 (2/76/2) | 145 | 4.5 | 155 | 9 | B | 0.02 | 46 |
| Example 4 | q/d/q | 2 axes/2 axes/2 axes | 150 (5/140/5) | 140 | 4 | 155 | 9 | B | 0.02 | 68 |
| Example 5 | q/b/b | 2 axes/2 axes/1 axis | 67 (2/50/15) | 135 | 5 | 150 | 8 | A | 0.01 | 44 |
| Example 6 | b/b/b | 1 axis/2 axes/1 axis | 90 (10/70/10) | 130 | 5 | 150 | 8 | A | 0.01 | 47 |
| Example 7 | q/c/q | 1 axis/2 axes/1 axis | 90 (10/70/10) | 140 | 4.5 | 155 | 8.5 | A | 0.02 | 37 |
| Example 8 | q/e/q | 2 axes/2 axes/2 axes | 70 (2/66/2) | 135 | 5 | 155 | 8 | A | 0.02 | 48 |
| Example 9 | q/i/q | 2 axes/2 axes/2 axes | 50 (1/48/1) | 140 | 4 | 150 | 8 | A | 0.03 | 37 |
| Example 10 | q/j/q | 2 axes/2 axes/2 axes | 60 (1/58/1) | 140 | 5 | 150 | 8.5 | A | 0.03 | 61 |
| Example 11 | q/k/q | 2 axes/2 axes/2 axes | 60 (2/56/2) | 145 | 4.5 | 150 | 9 | A | 0.05 | 44 |
| Example 12 | q/l/q | 2 axes/2 axes/2 axes | 130 (5/120/5) | 145 | 4 | 155 | 9 | A | 0.02 | 65 |
| Example 13 | q/j/j | 2 axes/2 axes/1 axis | 70 (1/55/14) | 135 | 5 | 150 | 8.5 | B | 0.02 | 52 |
| Example 14 | j/j/j | 1 axis/2 axes/1 axis | 90 (15/60/15) | 140 | 5 | 155 | 9 | B | 0.01 | 46 |

TABLE 3-continued

| | | Layer constitution of energy conversion film (i) | | | | | | Anchor coat agent | |
|---|---|---|---|---|---|---|---|---|---|
| | | | Thickness | Stretching condition | | | | | |
| | | | (thickness of | MD | | TD | | Coating | |
| | Resin com-position | Constitution of stretched layer | each layer) (μm) | Temperature (° C.) | Magnification (times) | Temperature (° C.) | Magnification (times) | Kind | amount (g/m²) | Porosity (%) |
| Example 15 | q/k/q | 1 axis/2 axes/1 axis | 95 (15/65/15) | 140 | 4.5 | 155 | 8.5 | B | 0.02 | 34 |
| Example 16 | q/m/q | 2 axes/2 axes/2 axes | 75 (1/73/1) | 135 | 5 | 150 | 8 | B | 0.02 | 53 |
| Comparative Example 1 | q/f/q | 2 axes/2 axes/2 axes | 50 (1/48/1) | 135 | 5 | 155 | 8 | A | 0.05 | 40 |
| Comparative Example 2 | q/g/q | 2 axes/2 axes/2 axes | 70 (2/66/2) | 155 | 3.5 | 160 | 8 | A | 0.05 | 73 |
| Comparative Example 3 | q/h/q | 2 axes/2 axes/2 axes | 50 (1/48/1) | 135 | 4 | 155 | 8 | A | 0.05 | 14 |
| Comparative Example 4 | q/n/q | 2 axes/2 axes/2 axes | 50 (1/48/1) | 130 | 5 | 150 | 9 | A | 0.03 | 13 |
| Comparative Example 5 | q/o/q | 2 axes/2 axes/2 axes | 90 (2/86/2) | 150 | 4 | 155 | 8 | A | 0.03 | 75 |
| Comparative Example 6 | q/p/q | 2 axes/2 axes/2 axes | 50 (1/48/1) | 135 | 5 | 150 | 9 | A | 0.03 | 8 |

Test Example

The thermoplastic resin stretched film having the anchor coat layer (C) provided thereon as fabricated in each of the Examples and Comparative Examples was used as the energy conversion film (i); the foregoing three-layered constitution was composed of the surface layer (B) (front surface)/core layer (A)/surface layer (B) (back surface); and aluminum was vapor deposited on the back surface of the energy conversion film (i) by using a vacuum vapor deposition apparatus (a trade name: VE-2030, manufactured by Hitachi High-Technologies Corporation) so as to have a surface resistivity value of not more than 1Ω, thereby forming an electrically conductive layer (D).

Subsequently, on an earth electrode of the electretization apparatus shown in FIG. 2, in which a pin-to-pin distance of the main electrode was set to 10 mm, and a gap between the main electrode and the earth electrode was set to 10 mm, the energy conversion film (i) was placed in such a manner that the aluminum vapor deposited surface thereof came into contact with the earth electrode surface; an applied voltage was increased step by step from 1 kV to measure a voltage at which the electretized film (ii) was broken by local spark discharge; and charge injection was performed at a voltage lower by 1 kV than this spark discharge voltage, thereby fabricating the electretized film (ii).

On the surface of the obtained electretized film (ii) on which aluminum was not vapor deposited, a silver powder-incorporated electrically conductive coating (a trade name: Dotite D-500, manufactured by Fujikura Kasei Co., Ltd.) was coated in a coating amount after drying of 1 g/m² and dried at ordinary temperature for 24 hours to form the electrically conductive layer (D), thereby obtaining the energy conversion apparatus material (iii). Furthermore, this energy conversion apparatus material (iii) was cut out into a size of 5 cm×5 cm square, and a lead wire was stuck onto the back and front surfaces thereof by using an electrically conductive adhesive tape (a trade name: AL-25BT, manufactured by Sumitomo 3M Limited), thereby fabricating a sample for energy conversion efficiency measurement.

(Piezoelectric Constant d33)

Figure 6:
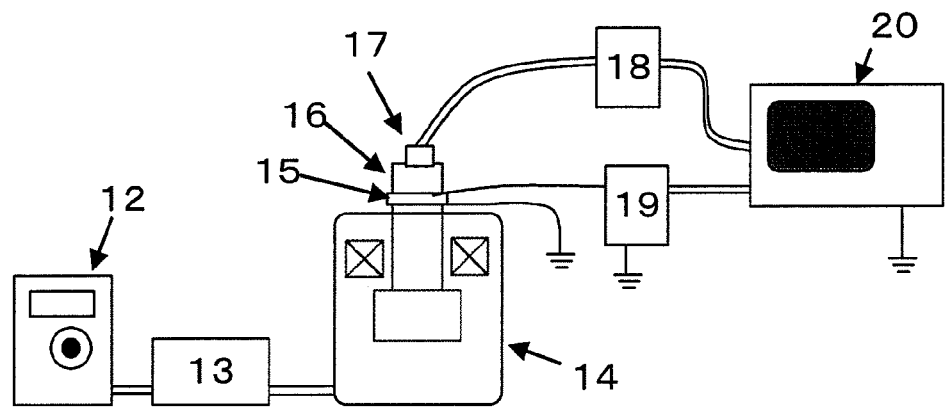
FIG. 6 is a piezoelectric constant measurement apparatus used in the Examples.

The piezoelectric constant d33 was measured 5 times by using the piezoelectric constant measurement apparatus shown in FIG. 6, an average value was calculated, and the evaluation was made according to the following criteria. The evaluation results are shown in Table 4.

A: Good (The d33 is 50 pC/N or more)

B: Slightly poor (The d33 is 10 or more and less than 50 pC/N)

C: Poor (The d33 is less than 10 pC/N)

TABLE 4

| | Inorganic powder and organic filler of core layer (A) | | Number of pores of specified size | | Measurement results of physical properties of film (i) | | | Test Example | |
|---|---|---|---|---|---|---|---|---|---|
| | | | | | Water vapor | Surface resistivity value (Ω) | | | |
| | Median size (D50, μm) | Concentration (wt %) | Machine direction (pores/mm²) | Transverse direction (pores/mm²) | permeability coefficient (g · mm/m² · 24 hr) | Front surface | Back surface | Electretization voltage (kV) | Piezoelectric constant d33 (pC/N) |
| Example 1 | 5.2 | 15 | 417 | 646 | 0.30 | 5.4E+13 | 6.3E+13 | 13 | A: 230 |
| Example 2 | 5.2 | 20 | 652 | 1045 | 0.46 | 9.8E+13 | 7.7E+13 | 14 | A: 280 |
| Example 3 | 10.1 | 20 | 487 | 1066 | 0.42 | 2.7E+14 | 2.4E+14 | 14 | A: 270 |
| Example 4 | 5.2 | 30 | 386 | 1231 | 0.59 | 3.3E+14 | 5.2E+14 | 17 | A: 160 |
| Example 5 | 5.2 | 20 | 840 | 860 | 0.37 | 8.1E+14 | 7.9E+14 | 14 | A: 230 |
| Example 6 | 5.2 | 20 | 757 | 929 | 0.35 | 1.5E+15 | 2.2E+15 | 16 | A: 210 |
| Example 7 | 10.1 | 20 | 657 | 1129 | 0.32 | 1.2E+14 | 1.7E+14 | 17 | A: 240 |
| Example 8 | 4.6 | 20 | 788 | 818 | 0.40 | 1.5E+14 | 2.2E+14 | 13 | A: 250 |

TABLE 4-continued

| | Inorganic powder and organic filler of core layer (A) | | Number of pores of specified size | | Measurement results of physical properties of film (i) | | | Test Example | |
|---|---|---|---|---|---|---|---|---|---|
| | | | | | Water vapor permeability | Surface resistivity value (Ω) | | | |
| | Median size (D50, μm) | Concentration (wt %) | Machine direction (pores/mm²) | Transverse direction (pores/mm²) | coefficient (g · mm/m² · 24 hr) | Front surface | Back surface | Electretization voltage (kV) | Piezoelectric constant d33 (pC/N) |
| Example 9 | 8.0 | 7 | 354 | 521 | 0.21 | 3.2E+14 | 1.2E+14 | 12 | A: 230 |
| Example 10 | 8.0 | 10 | 831 | 1003 | 0.33 | 2.4E+14 | 2.6E+14 | 13 | A: 240 |
| Example 11 | 4.1 | 10 | 750 | 981 | 0.27 | 5.3E+13 | 2.6E+13 | 13 | A: 200 |
| Example 12 | 8.0 | 15 | 542 | 1448 | 0.49 | 1.5E+15 | 1.0E+15 | 16 | A: 180 |
| Example 13 | 8.0 | 10 | 1055 | 1406 | 0.34 | 2.7E+14 | 3.7E+14 | 15 | A: 240 |
| Example 14 | 8.0 | 10 | 700 | 989 | 0.23 | 7.8E+14 | 5.6E+14 | 17 | A: 250 |
| Example 15 | 4.1 | 10 | 1000 | 839 | 0.21 | 1.2E+14 | 2.5E+14 | 18 | A: 220 |
| Example 16 | 8.3 | 10 | 1342 | 1443 | 0.42 | 3.7E+14 | 1.7E+14 | 14 | A: 260 |
| Comparative Example 1 | 2.2 | 20 | 75 | 208 | 0.58 | 5.6E+13 | 6.2E+13 | 13 | B: 30 |
| Comparative Example 2 | 10.1 | 60 | 530 | 2197 | 2.31 | 2.4E+13 | 2.2E+13 | 5 | C: <10 |
| Comparative Example 3 | 5.2 | 6 | 188 | 313 | 0.20 | 7.8E+13 | 6.9E+13 | 12 | C: <10 |
| Comparative Example 4 | 1.8 | 10 | 21 | 73 | 0.19 | 2.1E+14 | 1.1E+14 | 13 | C: <10 |
| Comparative Example 5 | 8.0 | 35 | 767 | 2275 | 4.14 | 5.7E+14 | 3.3E+14 | 12 | C: <10 |
| Comparative Example 6 | 8.0 | 1 | 83 | 149 | 0.20 | 2.6E+14 | 2.2E+14 | 13 | C: <10 |

While the present invention has been described in detail and with reference to specific embodiments thereof, it will be apparent to one skilled in the art that various changes and modifications can be made therein without departing from the spirit and scope thereof.

This application is based on Japanese Patent Application filed on Sep. 17, 2009 (Patent Application No. 2009-215184), Japanese Patent Application filed on Sep. 14, 2010 (Patent Application No. 2010-205549), and Japanese Patent Application filed on Sep. 14, 2010 (Pant Application No. 2010-205554), the contents of which are incorporated herein by way of reference.

INDUSTRIAL APPLICABILITY

The energy conversion film (i) of the present invention has excellent electro-mechanical energy conversion performances when formed into an electretized film (ii).

For that reason, the energy conversion film (i) of the present invention can be utilized for a speaker, a headphone, an ultrasonic oscillator, an ultrasonic motor, an oscillation controlling apparatus, a microphone, an ultrasonic sensor, a pressure sensor, an acceleration sensor, a strain sensor, a fatigue/crack sensor, a power generation apparatus, and the like, and the present invention largely contributes to the industrial fields thereof.

EXPLANATIONS OF REFERENCE NUMERALS

1: Energy conversion film (i)
2: Core layer (A)
3, 4: Surface layer (B)
5: Direct-current high-voltage power source
6, 8: Pin electrode
7: Earth electrode
10, 11: Wire electrode
9: Roll connected to an earth
12: Signal generator
13: Voltage amplifier
14: Oscillator
15: Electretized film (ii) having an electrically conductive layer (D) formed on both surfaces thereof (energy conversion apparatus material (iii))
16: Anchor
17: Acceleration sensor
18: Controller of acceleration sensor
19: Charge sensitive amplifier
20: Oscilloscope

The invention claimed is:

1. An electretized film comprising an energy conversion film, which comprises a core layer composed of a thermoplastic resin stretched film including a thermoplastic resin and at least one of from 12 to 50% by weight of an inorganic powder and from 2 to 30% by weight of an organic filler, as electretized upon being subjected to a direct-current high-voltage discharge treatment, wherein
 the core layer contains pores having a height in the thickness direction of the film of from 3 to 30 μm and a diameter in the plane direction of the film of from 50 to 500 μm at a frequency of from 100 to 3,000 pores/mm² through the cross-sectional observation in the thickness direction,
 the at least one of an inorganic powder and an organic filler, if either is present, has a median particle size (D50) of 4 to 15 μm as measured by a particle size distribution meter by laser diffraction, and
 the electretized film has a piezoelectric constant d33 of from 200 to 1,000 pC/N.

2. An energy conversion apparatus material comprising the electretized film according to claim 1; and an electrically conductive layer having a surface resistivity value of from $1\times10^{-2}$ to $9\times10^7 \Omega$ on at least one surface of the electretized film.

3. A method for manufacturing an energy conversion apparatus material comprising providing an electrically conductive layer having a surface resistivity value of from $1\times10^{-2}$ to $9\times10^7 \Omega$ on at least one surface of the electretized film according to claim 1.

* * * * *